US009978074B2

(12) United States Patent
Lyon et al.

(10) Patent No.: US 9,978,074 B2
(45) Date of Patent: May 22, 2018

(54) AUTOMATED EXPERIMENT SCHEDULING

(71) Applicant: CBS INTERACTIVE INC., San Francisco, CA (US)

(72) Inventors: Clifford Lyon, Somerville, MA (US); Ron H. Rothman, Bridgewater, NJ (US)

(73) Assignee: CBS Interactive Inc., New York, NY (US)

( * ) Notice: Subject to any disclaimer, the term of this patent is extended or adjusted under 35 U.S.C. 154(b) by 692 days.

(21) Appl. No.: 13/797,020

(22) Filed: Mar. 12, 2013

(65) Prior Publication Data
US 2014/0278198 A1    Sep. 18, 2014

(51) Int. Cl.
G01L 15/00 (2006.01)
G06F 17/18 (2006.01)
G06Q 30/02 (2012.01)

(52) U.S. Cl.
CPC .............................. G06Q 30/0201 (2013.01)

(58) Field of Classification Search
CPC . G06Q 30/0201; G06Q 30/02; G06Q 30/0202
USPC ........ 702/121, 179, 181; 715/781, 753, 702, 715/701, 703, 243, 204, 789, 782, 765, 715/760
See application file for complete search history.

(56) References Cited

U.S. PATENT DOCUMENTS

| 2003/0236775 | A1* | 12/2003 | Patterson | G06F 9/4443 |
| 2008/0114567 | A1* | 5/2008 | Jeske | G05B 23/0221 702/179 |
| 2010/0064282 | A1* | 3/2010 | Triou | G06F 11/3696 717/125 |
| 2011/0246134 | A1* | 10/2011 | Frishberg | G06F 11/25 702/179 |
| 2013/0007590 | A1* | 1/2013 | Rivera | G06F 3/0481 715/234 |
| 2013/0283134 | A1* | 10/2013 | Bai | H03M 13/3738 714/794 |
| 2014/0075336 | A1* | 3/2014 | Curtis | G06F 3/0481 715/753 |

* cited by examiner

Primary Examiner — Eman Alkafawi

(57) ABSTRACT

Various embodiments are generally directed to an automated A/B testing system using a combination of classical and alternative statistical analysis to control the performance A/B tests. An apparatus includes a processor circuit; and logic to commence collection of a specified number of samples of user responses to multiple versions of a user interface in a test, employ an alternative statistical analysis to analyze the samples as they are collected, determine whether a proposed version elicits a statistically significant improvement in user response over a control version, terminate the test before the specified number of samples are collected in response to a statistically significant improvement over the control version elicited by the proposed version, and complete collection of the specified number of samples and employ a classical statistical analysis to analyze the samples in response to the proposed version not eliciting the statistically significant improvement. Other embodiments are described and claimed.

27 Claims, 11 Drawing Sheets

AUTOMATED EXPERIMENT SCHEDULING

BACKGROUND

The use of "A/B" testing as a form of experimentation to evaluate proposed changes to user interfaces of remote computing device portals (e.g., websites, etc.) provided by servers that provide various services to remote users has become commonplace. In such testing, alternate versions of a user interface of a portal are created, usually including an existing version (e.g., a control or baseline version) against which one or more proposed new versions are to be tested on randomly selected users. As the server providing the services is accessed by remote users via their computing devices, the server randomly selects one of the versions of the user interface to provide to each of those users. Metrics important to the providers of the portal are computed from the observed behavior of users exposed to various versions of the user interface, and those metrics are then analyzed to determine whether those proposed changes to content presentation positively or negatively influenced a desired activity on the part of those users.

As those familiar with such A/B testing will readily recognize, the need to obtain a large enough sample size of users exposed to each of the different versions of the user interface to obtain statistically significant results often requires running such a test for multiple days, possibly multiple weeks. Where the services provided by a server are in a competitive marketplace such that there is a desire to quickly adopt any improvement in the user interface that demonstrates positive results, or where there are numerous proposed changes to the user interface to be tested, there may be a strong desire to end a current A/B test that is underway early and to begin a next A/B test as soon as possible. The need to obtain sufficient samples to be able to obtain statistically significant results is usually at odds with this desire to proceed more quickly.

However, there can be instances where the resulting user behavior recorded by the samples varies sufficiently to enable the discovery of statistically significant results without the need to await collection of an originally selected number of samples. Unfortunately, determining whether or not such a situation has occurred in a given A/B test such that it can be ended early requires some amount of statistical analysis to be performed on a recurring basis using one or more statistical analysis techniques. Such recurring performance of such calculations can be time consuming, and the moment when sufficient samples are determined to have been taken may occur at an odd hour of a day or night, such that no one is available to perform the statistical analysis to discover this fact or to act upon this fact until a following day. It is with respect to these and other considerations that the techniques described herein are needed.

DETAILED DESCRIPTION

Figure 1:
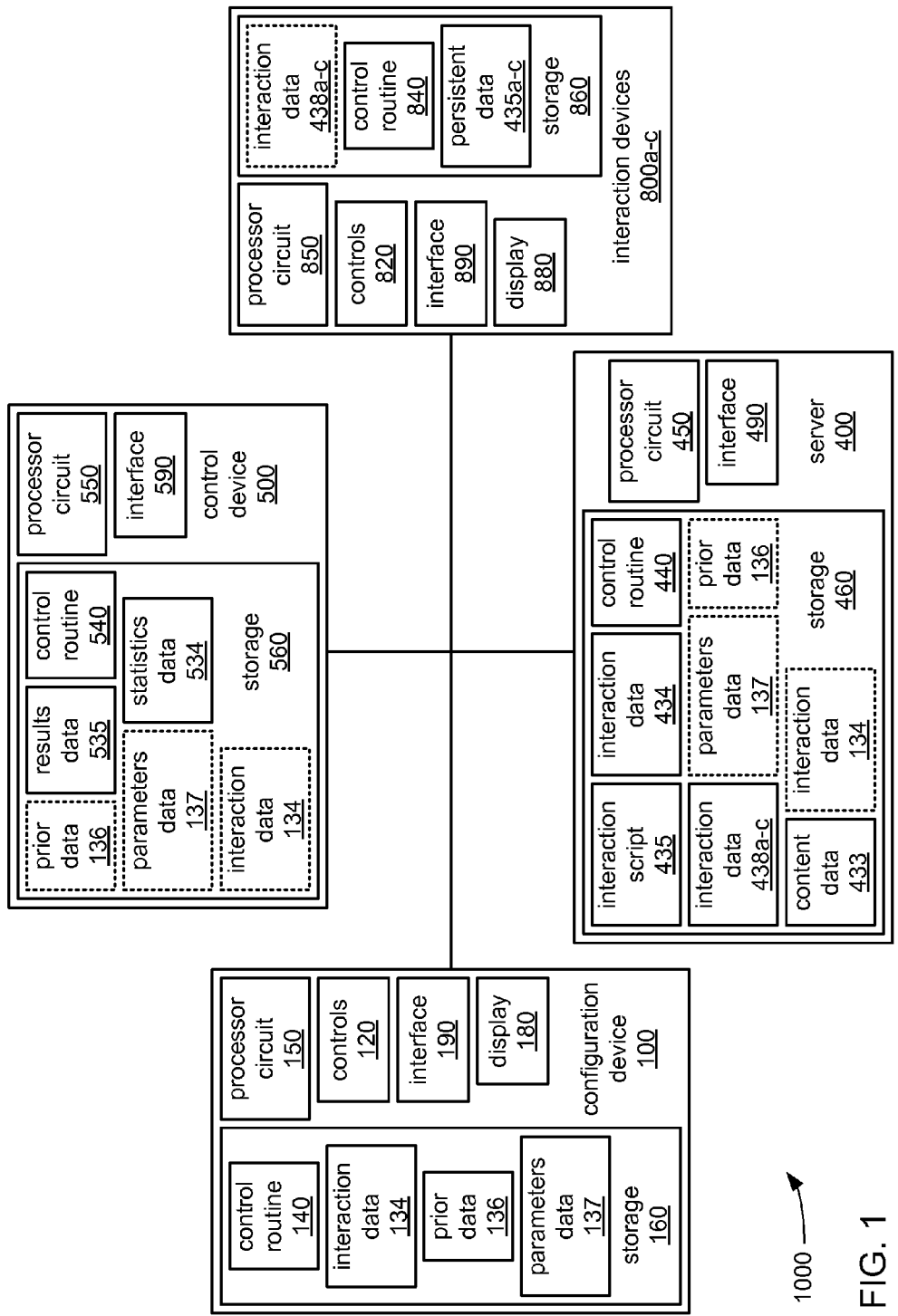
FIG. 1 illustrates a first embodiment of interaction among computing devices.

Various embodiments are generally directed to an automated A/B testing system using a combination of classical and alternative statistical analysis of test data to control the performance of and analyze the results of A/B tests. More specifically, such requirements as a specified number of samples, a desired degree of uncertainty in results, a desired confidence level, etc., may be used to automatically determine when an A/B test ends. Each A/B test is initially configured to require the specified number samples to determine when it is to end in accordance with typical practices of classical statistics analysis. However, as each A/B test is performed, alternative statistical analysis techniques are employed to recurringly analyze the samples as they are collected to determine if there are any statistically significant results arising early enough to enable culling of one or more user interface versions from the test and/or to enable the test be ended early. Further, automated notifications of such conditions as early ending of testing and/or detection of primacy/newness effects may be transmitted to personnel who oversee the conduct of A/B testing.

An important goal of such testing is to ensure that sufficient samples of user behavior upon exposure to randomly selected versions of a user interface are collected so as to obtain statistically significant results, i.e., results based on data that is distinguishable with a desired degree of certainty from variances likely to occur in the samples (e.g., so-called "noise" in the data). Normally, in accordance with best practices in the field of statistics, A/B tests are conducted using null-hypothesis significance testing (NHST or "t-test") techniques (or other form of classical statistical analysis) in which an amount of samples of data required is calculated in advance from one of various equations selected based on the details of the experiment, and based on one or more variables including a desired "confidence level" (typically selected to be 95%), a "standard deviation" (value depends on the type of test and data) and a "statistical power" (typically selected to be 80%). It is almost always impossible to use statistical analysis to give an absolutely certain answer to a question. Results of statistical analysis are almost always an expression of a probability, and that expression of probability is almost always accompanied by a degree of uncertainty in the correctness of that result. Thus, it is almost always the case that statistical results can only be made more or less certain to be correct, and generally, the higher the certainty desired, the more samples must be collected.

Of course, it takes time to collect samples in A/B tests of a user interface, and therefore, decisions must be made as to what balance is acceptable between expediency in performing each test (especially where there are numerous tests to perform) and certainty of correctness in the results. Unfortunately, although the number of samples required may be specified in advance once an acceptable balance is selected in NHST analysis, the amount of time required to obtain that number of samples can only be estimated in advance, since the rate at which samples are collected necessarily depends on users choosing to access the services provided by a server such that they become available to be exposed to a version of a user interface. As a result, depending on various factors affecting user behavior that are likely out of the control of those conducting a test, the length of time a test requires may easily take an undesirably long period of time.

However, there has been a growing debate in the field of statistics of the statistical analysis of NHST, including debate of the validity of the typical calculations performed in determining a necessary sample size. Alternative statistical analysis techniques are gaining favor, including non-classical statistical analysis techniques such as Bayesian analysis. An advantage afforded by some of these other techniques is the opportunity, depending on circumstances, to provide useable statistical results with fewer samples. This presents the possibility of conducting at least some A/B tests in less time than would be possible under NHST analysis.

Unfortunately, unlike such classical statistical analysis techniques as NHST, such alternative statistical analysis techniques as Bayesian analysis typically require the provision of data indicative of user behavior observed in past testing or user behavior predicted by a model as an input into their analysis (sometimes referred to as "prior data"). Yet, it is often the case in A/B testing of variations in content presentation and/or other aspects of user interfaces that there is little or none of such data available. As a result, it is usually necessary to rely upon models derived based on user behavior observed in user exposure to versions of user interfaces that are at least somewhat similar to, but not the same as, variations to be tested. This introduces a significant likelihood that the input provided by those models to such an analysis may be flawed.

To balance these advantages and disadvantages of classical and alternative statistical analysis techniques, an A/B test is performed in a manner that employs both a classical statistical analysis technique and an alternative statistical analysis technique in parallel. A number of samples required to provide sufficient samples for the classical analysis technique is derived and specified as providing the default trigger to when the test is to terminate. The test is then performed with different users being randomly selected to be exposed to different ones of at least one control version of a user interface (usually the version that currently exists) and at least one proposed version of the user interface (in which there is some proposed variation or combination of variations of the manner in which content is presented), and samples of data indicative of observed user behavior are collected. During collection of that data, the alternative statistical analysis technique is recurringly performed on the samples as they are collected to determine whether the samples already collected up to that time provide any statistically significant indication of a variation of the user interface that need no longer be tested and/or of whether the entire test need no longer be continued.

It may be that the alternative statistical analysis technique reveals that one of the proposed versions of the user interface elicits a statistically significant degree of desired change in user behavior such that it is a clear improvement over a current version. In such a case, the test may be terminated early and a next test immediately scheduled to begin. Such early termination of a test upon discovery that one of the proposed versions is so clearly an improvement over the current version may be deemed desirable where there is a need or desire to implement any such clear improvements quickly such that waiting through any further testing is not seen as acceptable. Alternatively, it may be that the alternative statistical analysis technique reveals that one of the proposed versions of the user interface elicits no statistically significant degree of change in user behavior, or results in a statistically significant undesirable change in user behavior, such that continuing to test that version would only waste valuable time. In such a case, the test may be altered to cease testing that version (i.e., that version may be culled from the test), thereby shortening the remaining duration of the test by removing the need to continue collecting samples associated with testing that version.

In yet another alternative, it may be that the alternative statistical analysis technique reveals that none of the proposed variations of the user interface is likely to be found to result in a statistically significant degree of change in user behavior such that it appears that all of the proposed versions being tested provide no statistically significant improvement over the current version. In such a case, the entire test might be terminated early, since it would appear that continuing the test would simply waste valuable time. However, such a decision to terminate the test early would only be valid if the model used to derive the data indicative of predicted user behavior that is provided as an input to the alternative statistical analysis technique (i.e., the prior data) is already known to be a valid model. As previously discussed, it is often the case in A/B testing of variations in the presentation of content in a user interface that the model employed in making such predictions is of user behavior when exposed to similar (but not the same) type of variation in the user interface such that the model may or may not be validly applicable to the type of variation proposed to be the subject of the test. Given this, the test might be continued through to completion such that the originally specified number of samples required for the classical analysis technique is collected, and the classical analysis technique is then applied.

If application of the classical analysis technique provides substantially similar results as the recurring application of the alternative statistical analysis technique such that both indicate no statistically significant improvement in any proposed variation over the current variation, then the validity of the choice of model for use in the alternative analysis of testing of those proposed variations is confirmed. However, if application of the classical analysis technique provides a result that is substantially different from the results from applying the alternative statistical analysis technique (e.g., disagreement as to whether one of the proposed variations provides a statistically significant improvement), then the choice of model for use in the alternative analysis of testing of those proposed variations is shown to be invalid. Discovery of whether a given model is or is not a valid choice in such testing enables one or more valid models to be identified for use with particular types of proposed variations to be tested in later tests such that the use of an alternative statistical analysis technique in those later tests may be more likely to be effective in providing indications of opportunities to either shorten a test or terminate a test early. Thus, such side-by-side use of both a classical statistical analysis technique and an alternative statistical analysis technique may enable more efficient use of valuable testing time for both a current test to which they are applied and to one or more future tests due to verification of the validity of using one or more particular models.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result.

These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may comprise a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of a test system 1000 incorporating one or more of a configuration device 100, a server 400, a control device 500, and interaction devices 800a, 800b and 800c. Each of these computing devices 100, 400, 500 and 800a-c may be any of a variety of types of computing device, including without limitation, a desktop computer system, a data entry terminal, a laptop computer, a netbook computer, an ultrabook computer, a tablet computer, a handheld personal data assistant, a smartphone, a body-worn computing device incorporated into clothing, a computing device integrated into a vehicle (e.g., a car, a bicycle, a wheelchair, etc.), a server, a cluster of servers, a server farm, etc.

As depicted, at least some of these computing devices 100, 400, 500 and 800a-c exchange signals concerning a user interface for a portal (e.g., a website) through which services provided by the server 400 are accessed via one or more of the interaction devices 800a-c. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

During normal operation of the server 400 (e.g., at times when no test of differing versions of user interface is underway), one or more of the interaction devices 800a-c is operated by a user to access services provided by the server 400. Such services may include and are not limited to one or more of online product sales, Internet-based audio or video on demand, online encyclopedia, email services, file sharing services, online teleconferencing and/or videoconferencing services, news, financial transaction services, etc. The server 400 instantiates a portal for each interaction device accessing it to segregate its communications with each such interaction device from its communications with the others. With such a portal, the server 400 provides a user interface to make accessing and using the provided services easier. The instantiation of webpages of a website for each interaction device accessing services through the website is an example of the provision of such a portal with such a user interface.

To better enable the provision of such a user interface in a manner that eases the task of making alterations to it over time, the user interface is often at least partly defined in an interaction data and an interaction script. The interaction script is interpreted by a script interpreter executed by a processor circuit of the server 400 that provides that user interface. Examples of languages in which such interaction script may be written include and are not limited to JavaScript™, PHP and Python. The interaction data often includes indications of what content is to be presented and/or where to obtain the content from, and/or indications of how the content is to be presented (e.g., where on a display, in what format, etc.). The interaction data may include a description of aspects of that user interface described in a markup language such as HTML or XML.

The same server transmits another interaction data to an interaction device operated by a user to access the server. That interaction data includes indications of what content is to be presented on the display of that interaction device, in what manner, etc., for whatever is being specifically viewed on that display of that interaction device at that time. More specifically, among the information that may be contained within these pieces of interaction data are definitions of visible areas of the user interface that are visually presented on a display, and in which various pieces of content are visually presented (e.g., a header, a footer, a navigation area, an area in which an organization's logo is displayed, etc.). Such content may include and is not limited to an organization's contact information, product lists and/or descriptions, descriptions of services, lists of downloadable files, various pieces of text and/or graphics, etc. Also, various aspects of the manner in which that content is presented in each of the visible areas may also defined.

Additionally, such pieces of interaction data may various virtual controls, including and not limited to, "scroll bars", "radio buttons", "check boxes", "drop-down menus", text entry boxes, "slider" controls, "arrow buttons", "clickable links" and numerous other virtually created controls as will be recognizable to those skilled in the art. Such virtual controls are defined to be operable to cause a defined action to occur in response to being selected via a pointing device, including and not limited to, a mouse, a stylus, a touchpad, a touch sensor overlain on the display, etc. In this way, a mechanism of user input made up of multiple controls can be defined in virtual form such that the need to provide physical controls (e.g., buttons, knobs, switches, levers, etc.)

as a mechanism of user input may be precluded. Such virtual controls are advantageously easier to alter through editing of an interaction data, rather than through physical alteration of physical controls.

Figure 2:
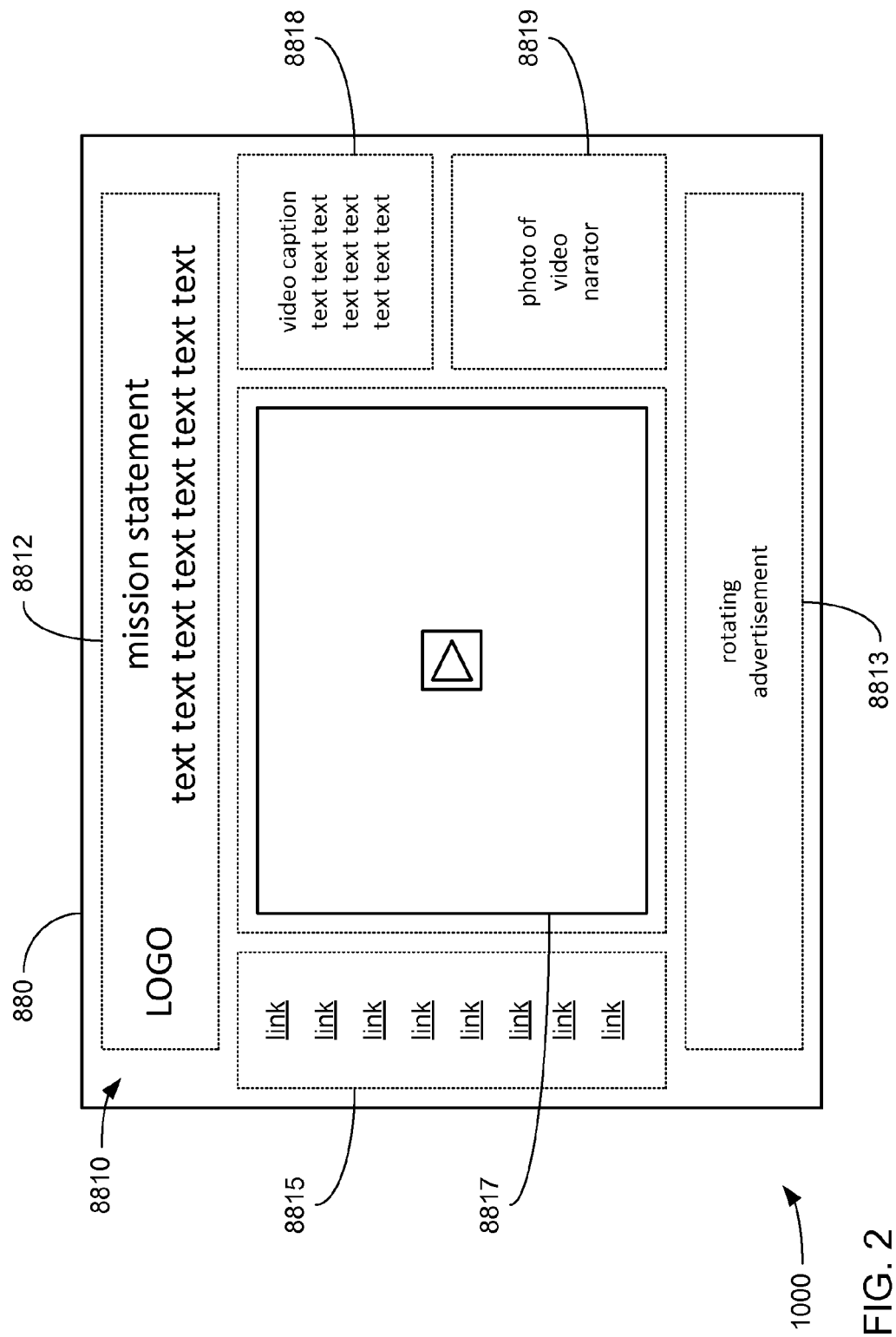
FIG. 2 illustrates an example a visual portion of a user interface provided by the first embodiment.

Turning briefly to FIG. 2, an example is depicted of a visible portion 8810 (e.g., a webpage) of a user interface that may be provided by the server 400 for visual presentation on a display 880 of one of the interaction device 800a-c. As depicted, the visible portion 8810 is divided into various visible areas, specifically, a header 8812, a footer 8813, a navigation area 8815, a video content area 8817, a text content area 8818, and an image content area 8819. As has been discussed, these visible areas may be defined in an interaction script. As also depicted, image content providing an organization's logo and text content providing the organization's "mission statement" are presented in the header 8812, rotating advertisements are presented in the footer 8813, various links operable by way of being selected to cause visual presentation of one of various other visible portions (e.g., a different webpage) are presented in the navigation area 8815, video content with a virtual control to commence playing is presented in the video content area 8817, text content of a caption associated with the video content is presented in the text content area 8818, and photo image content depicting the narrator of the video content is presented in the image content area 8819. Further, aspects of the presentation of content in each of these visible areas is also defined in an interaction script, including and not limited to, font size, font style, whether content is rotated, pixel depth of image or video pixels, etc. The pieces of content to be presented in each of these visible areas 8812, 8813, 8815, 8817, 8818 and 8819 are likely stored in a separate content data (possibly within an interaction data provided to an interaction device), although at least some of the content may be embedded amongst the interaction script. It should be noted that although the visible portion 8810 is depicted as fitting entirely within the viewable area of the display 880, depending on the number and size of the visible areas relative to the size and resolution of any particular display 880, it is entirely possible for the visible portion 8810 to not be able to fit within the viewable area of the display 880 such that some form of panning and/or scrolling must be implemented (possibly with the use of virtual controls such as horizontal and/or vertical scroll bars) to enable visual access to the entirety of the visible portion 8810.

Returning to FIG. 1, the server 400 may be operated to forego normal provision of a user interface for use in providing services in favor of a random provision of different versions of a user interface to different interaction devices (e.g., different ones of the interaction devices 800a-c) as part of performing a test of proposed alterations to the presentation of content in one or more visible areas. In preparation for such testing, the configuration device 100 provides an entry environment enabling an operator of the configuration device 100 to enter details of an A/B test to be performed concerning one or more proposed changes to content presentation in a user interface provided by the server 400 to users of one or more of the interaction devices 800a-c in accessing the server 400 therefrom to make use of services provided by the server 400. The entry environment also enables the operator to enter various testing parameters, including one or more of a specified number of samples to be collected to enable performance of a classical statistical analysis (e.g., NHST), prior data as an input to an alternative form of statistical analysis (e.g., Bayesian analysis), indications of whether an initial number of samples should be ignored in response to detection of a newness or primacy effect, etc.

An interaction data indicative of variations in content presentation in different versions of the user interface and a parameters data indicative of parameters for the classical and alternative statistical analyses are generated from what is entered. In some embodiments, the interaction data and parameters data may then either be directly provided to the server 400 to be used as an input by the server 400 in providing different versions of the user interface and relatively autonomously controlling performance of the test. In other embodiments, both may be provided to the control device 500 to be used by it in communications with the server 400 to cause the provision of different versions of the user interface and control performance of the test by the server 400.

Thus, in some embodiments, the server 400 itself recurringly performs the alternative statistical analysis as samples are collected (i.e., behaviors of users are recorded) during performance of the test to recurringly attempt to make one or more early determinations based on the samples collected thus far. For example, the server 400 recurringly employs the alternative statistical analysis to determine if a statistically significant improvement over the control version of the user interface is shown by one of the other versions that implements proposed variations such that the entire test may be terminated early due to an improved version having already been identified. Alternatively or additionally, the server 400 recurringly employs the alternative statistical analysis to determine if it has become statistically clear enough that at least one of the versions that implements proposed variations will not show a statistically significant improvement over the control version of the user interface such that it may be culled from the performance of the test as further testing of it is deemed pointless. Such culling of versions of the user interface from further testing amidst performance of the test speeds up overall conduct of the test as fewer versions remain to continue to be tested, and accordingly, an overall lesser quantity of samples need to be collected. Indeed, it may be determined through recurring use of the alternative statistical analysis that none of the versions implementing proposed variations will show a statistically significant improvement over the control version such that the test may be terminated early as there is deemed to be no point in continuing to test any of those versions against the control version. In other embodiments, such recurring use of the alternative statistical analysis may be performed by the control device 500, and it may be the control device 500 that makes determinations of what versions of the user interface implementing proposed variations may be culled from testing and/or whether or not the entire test may be terminated early.

Regardless of whether the control device 500 employs an interaction data and parameters data received from the configuration device to control the performance of a test by the server 400, the control device 500 monitors the progress of the test, recording various metrics of behavior of users who are presented with the different versions of the user interface selected for testing. The metrics are analyzed by the monitoring device 500 to derive ultimate results of the test indicating whether any proposed new variations in content presentation bring about a desired change in the actions of users. Such desired actions may include one or more of purchasing more products, "clicking thru" more advertisements, exploring more webpages of a website, reducing "bouncing" (e.g., where a user accesses a webpage, but then leaves it relatively quickly, rather than lingering there), downloading more files, sharing more information about themselves that may be used in marketing efforts, etc.

Each of the interaction devices 800a-c is a computing device operated by one or more users to access whatever services may be provided by the server 400 via the user interface provided by the server 400 that is the subject of the test. Each of the interaction devices 800a-c includes a display 880 by which a visible portion of that user interface is visually presented to those users, but with the variations of content presentation that have been selected for testing during performance of the test.

In various embodiments, the configuration device 100 incorporates a storage 160 storing a control routine 140, an interaction data 134, a prior data 136 and a parameters data 137; a processor circuit 150; controls 120; the display 180; and an interface 190 coupling the configuration device 100 to the network 999. In executing a sequence of instructions of at least the control routine 140, the processor circuit 150 is caused to visually present on the display 180 one or more prompts for an operator to provide indications of variations of the manner in which content is presented in a user interface to test, as well as indications of various test parameters, and then await receipt of the provision of those indications by the operator via the controls 120. Upon at least receipt of indications of such variations and parameters, the processor circuit 150 is caused to generate the interaction data 134 and the parameters data 137. The processor circuit 150 may then be further caused to transmit the interaction data 134, the prior data 136 and/or the parameters data 137 to one or both of the server 400 and the control device 500 to be used in controlling performance of the tests by the server 400.

In various embodiments, the server 400 incorporates a storage 460 storing a control routine 440, an interaction script 435, an interaction data 434, a content data 433 and interaction data 438a-c; a processor circuit 450; and an interface 490 coupling the server 400 to the network 999. In some of these embodiments, the storage 460 may also store the interaction data 134, the prior data 136 and the parameters data 137. In executing a sequence of instructions of at least the control routine 440, the processor circuit 450 is caused to receive signals from one or more of the interaction devices 800a-c conveying requests from their users for access to services provided by the server 400. In response, the processor circuit 450 is caused to interpret the interaction script 435 to provide one or more versions of a user interface.

During normal operation of the server 400, the server simply provides a version of the user interface as defined by a combination of the interaction script 435 and the interaction data 434 to each of the interaction devices 800a-c. In so doing, the processor circuit 450 is caused to transmit corresponding ones of the interaction data 438a-c to the interaction devices 800a-c, each of the interaction data 438a-c made up of content to be visually presented and/or indications of the manner in which that content is to be presented by the interaction devices 800a-c. During such normal operation of the server, that manner of visual presentation of content is substantially similar across all of the interaction devices 800a-c.

However, during operation of the server 400 to perform tests of different versions of the user interface, the server 400 is directed by a combination of the interaction script 435 the interaction data 134 and the parameters data 137 to perform one or more tests in which the server 400 provides randomly selected versions of the user interface to each of the interaction devices 800a-c in which content drawn from the content data 433 is visually presented in one or more visual areas in varying ways selected for inclusion in the test. In so doing, the processor circuit 450 is also caused to transmit corresponding ones of the interaction data 438a-c to the interaction devices 800a-c, each of the interaction data 438a-c made up of content to be visually presented and/or indications of the different manner in which that content is to be differently visually presented by each of the interaction devices 800a-c. The server 400 monitors the behavior of users of the interaction device 800a-c as they respond to being presented with different versions of the user interface by the server 400, and relays indications of those behaviors via the network 999 to the control device 500. It is in this way that "samples" of user responses to different versions of a user interface are "collected" by the server 400 directly and/or by the control device 500 indirectly (i.e., through the indications of those responses provided by the server 400).

In various embodiments, the control device 500 incorporates a storage 560 storing a control routine 540, a statistics data 534 and a results data 535; a processor circuit 550; and an interface 590 coupling the monitoring device 500 to the network 999. In some of these embodiments, the storage 560 may also store the interaction data 134, the prior data 136 and the parameters data 137. In executing a sequence of instructions of at least the control routine 540, the processor circuit 550 is caused to operate the interface 590 to receive signals conveying metrics indicative of aspects of user behavior in being presented with the different randomly selected versions of the user interface, and/or aspects of user behavior in making use of services provided by the server 400 through each of those versions of the user interface while the server 400 performs a test. Such received metrics are stored by the processor circuit 550 as the statistics data 534, and are subsequently statistically analyzed by the processor circuit 550 to generate results that are stored as the results data 535.

As has been discussed, one or both of the server 400 and the control device 500 is provided with the interaction data 134, the prior data 136 and/or the parameters data 137 from the configuration device 100 to be used to directed the performance of a test by the server 400. The interaction data 134 includes indications of variations and/or combinations of variations of the manner in which content is visually presented in each version of the user interface to be included in the test. The prior data 136 includes indications of user behavior either from observations or derived from a model of user behavior to be used as an input to alternative statistical analysis. The parameters data 137 includes indications of one or more of what forms of statistical analysis to perform, how many samples are required for conduct of a classical statistical analysis, whether a version of the user interface may be culled to reduce the overall duration of the test, and/or whether the test may be terminated early and/or extended. Where the server 400 receives the interaction data 134 and the parameters data 137, the server 400 may perform such statistical analyses and control its performance of the test such that the server 400 is enabled to act largely autonomously. Where the control device 500 receives the interaction data 134 and the parameters data 137, the control device 500 may communicate with the server 400 via the network 999 to receive indications of the behavior of users to enable performance of such statistical analyses by the control device 500, convey at least portions of the interaction data 134 to the server 400 and/or direct performance of the test by the server 400.

In various embodiments, each of the interaction devices 800*a-c* incorporates a storage 860 storing a control routine 840, one of the interaction data 438*a-c* and possibly one of persistent data 435*a-c*; a processor circuit 850; controls 820; the display 880; and an interface 890 coupling each of the interaction devices 800*a-c* to the network 999. In executing a sequence of instructions of at least the control routine 840, the processor circuit 850 of each of the presentation devices 800*a-c* is caused to receive signals from the server 400 conveying a corresponding one of the interaction data 438*a-c* made up of content to be visually presented and/or indications of the manner in which that content is to be presented in one of the varying ways that corresponds to one of the versions of user interface selected for the test. Which of the interaction devices 800*a-c* is caused to present which of those versions of the user interface is randomly selected by the server 400. In some embodiments, each of the interaction devices 800*a-c* may be caused to present a randomly selected version of the user interface each time they are operated to access the server 400 to make use of services provided by the server 400.

However, in other embodiments, it may be deemed desirable to provide a consistent user experience each time a particular one of the interaction devices 800*a-c* is operated to access the server 400, at least for the duration of the test or for the duration of a round of the test. In such other embodiments, the server 400 may transmit one of a persistent data 435*a-c* (e.g., a so-called "cookie") to corresponding ones of the interaction devices 800*a-c* the first time that each is operated to access the server 400 during the course of the test or during the course of a round of the test. Each one of the persistent data 435*a-c* includes an indication of which version of the user interface was initially randomly selected to be visually presented by its corresponding one of the interaction devices 800*a-c* when each was first operated to access the server 400 during the test or during a particular round of the test. Alternatively, the server 400 may store identifying information from each of the interaction devices 800*a-c* along with an indication of what version of the user interface was last presented to each in order to enable the server 400 to provide those same versions to each of the interaction devices 800*a-c* during a subsequent access. Thus, for the duration of the test or for the duration of a particular round of the test, the same randomly chosen version of the user interface is consistently presented on the display 880 each time each of the interaction devices 800*a-c* is operated to access the server 400. When the test ends, the persistent data 435*a-c* may be erased from the storage 860 of each of the interaction devices 800*a-c*, and all of the interaction devices 800*a-c* may be caused to visually present the same version of the user interface, which may be the original version in use before the test, or may be a new version selected for use based on the results of the test.

It should be noted that although only three interaction devices 800*a-c* are depicted for sake of simplicity in depiction and discussion herein, it is envisioned that the server 400 would provide services to a relatively large number of interaction devices (and thereby, to a relatively large number of users). Indeed, those familiar with A/B test methodologies will readily recognize that larger numbers of participants is desirable. As will be explained in greater detail, percentages of participants to be randomly selected to experience each of the different versions of the user interface are specified as part of the test parameters indicated in the interaction data 134, making it desirable to have a large enough set of participants that each version the user interface is able to be tried with enough participants to ensure the collection of statistically valid data.

In various embodiments, each of the processor circuits 150, 450, 550 and 850 may comprise any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of these processor circuits may comprise a multi-core processor (whether the multiple cores coexist on the same or separate dies), and/or a multi-processor architecture of some other variety by which multiple physically separate processors are in some way linked.

In various embodiments, each of the storages 160, 460, 560 and 860 may be based on any of a wide variety of information storage technologies, possibly including volatile technologies requiring the uninterrupted provision of electric power, and possibly including technologies entailing the use of machine-readable storage media that may or may not be removable. Thus, each of these storages may comprise any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may comprise multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, each of the interfaces 190, 490, 590 and 890 employ any of a wide variety of signaling technologies enabling each of computing devices 100, 400, 500 and 800, respectively, to be coupled through the network 999 as has been described. Each of these interfaces comprises circuitry providing at least some of the requisite functionality to enable such coupling. However, each of these interfaces may also be at least partially implemented with sequences of instructions executed by corresponding ones of the processor circuits 150, 450, 550 and 850 (e.g., to implement a protocol stack or other features). Where one or more portions of the network 999 employs electrically and/or optically conductive cabling, one or more of these interfaces may employ signaling and/or protocols conforming to any of a variety of industry standards, including without limitation, RS-232C, RS-422, USB, Ethernet (IEEE-802.3) or IEEE-1394. Alternatively or additionally, where one or more portions of the network 999 entails the use of wireless signal transmission, one or more of these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. It should be noted that although each of the interfaces 190, 490, 590 and 890 are depicted as a single block, one or more of these may comprise multiple interfaces that may be based on differing signaling technologies. This may be the case especially where one or more of these interfaces couples corresponding ones of the computing devices 100, 400, 500 and 800 to more than one network, each employing differing communications technologies.

In various embodiments, each of the controls 120 and 820 may comprise any of a variety of types of manually-operable controls, including without limitation, lever, rocker, pushbutton or other types of switches; rotary, sliding or other types of variable controls; touch sensors, proximity sensors, heat sensors or bioelectric sensors, etc. Each of these controls may comprise manually-operable controls disposed upon a casing of corresponding ones of the computing devices 100 and 800, and/or may comprise manually-operable controls disposed on a separate casing of a physically separate component of corresponding ones of these computing devices (e.g., a remote control coupled to other components via infrared signaling). Alternatively or additionally, each of these controls may comprise any of a variety of non-tactile user input components, including without limitation, a microphone by which sounds may be detected to enable recognition of a verbal command; a camera through which a face or facial expression may be recognized; an accelerometer by which direction, speed, force, acceleration and/or other characteristics of movement may be detected to enable recognition of a gesture; etc.

In various embodiments, each of the displays 180 and 880 may be based on any of a variety of display technologies, including without limitation, a liquid crystal display (LCD), including touch-sensitive, color, and thin-film transistor (TFT) LCD; a plasma display; a light emitting diode (LED) display; an organic light emitting diode (OLED) display; a cathode ray tube (CRT) display, etc. Each of these displays may be disposed on a casing of corresponding ones of the computing devices 200 and 800, or may be disposed on a separate casing of a physically separate component of corresponding ones of these computing devices (e.g., a flat panel monitor coupled to other components via cabling).

FIGS. 3, 4, 5 and 6, taken together, illustrate portions of the block diagram of FIG. 1 in greater detail. More specifically, aspects of the operating environments of the computing devices 100, 400, 500 and 800*a-c* are depicted, in which corresponding ones of the processor circuits 150, 450, 550 and 850 are caused by execution of respective control routines 140, 440, 540 and 840 to perform the aforedescribed functions. As will be recognized by those skilled in the art, each of these control routines, including the components of which each is composed, implement logic as a sequence of instructions and are selected to be operative on (e.g., executable by) whatever type of processor or processors are selected to implement each of these processor circuits. Further, it is important to note that despite the depiction in these figures of specific allocations of implementation of logic between hardware and software components and routines made up of instructions, different allocations are possible in other embodiments.

In various embodiments, one or more of the control routines 140, 440, 540 and 840 may comprise a combination of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor circuits 150, 450, 550 and 850, including without limitation, Windows™, OS X™, Linux®, Android OS™, Symbian™, Blackberry® OS, iOS™ and ThreadX®. Where one or more device drivers are included, those device drivers may provide support for any of a variety of other components, whether hardware or software components, that comprise one or more of the computing devices 100, 400, 500 and 800*a-c*.

Each of the control routines 140, 440, 540 and 840 comprises a communications component 149, 449, 549 and 849, respectively, executable by corresponding ones of the processor circuits 150, 450, 550 and 850 to operate corresponding ones of the interfaces 190, 490, 590 and 890 to transmit and receive signals, possibly via the network 999 as has been described. As will be recognized by those skilled in the art, each of these communications components are selected to be operable with whatever type of interface technology is selected to implement each of the corresponding ones of these interfaces.

Figure 3:
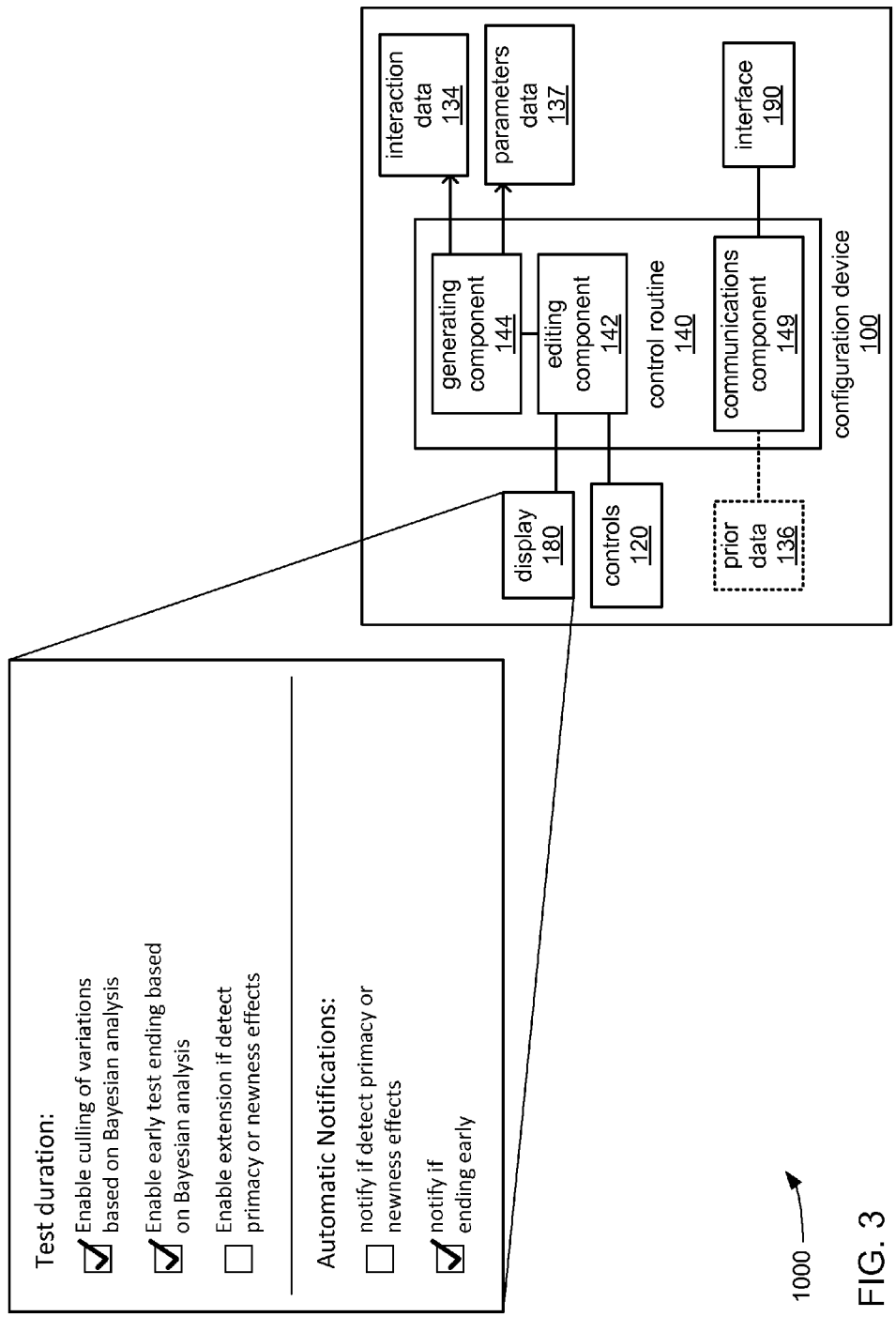
FIGS. 3, 4, 5 and 6 illustrate portions of the embodiment of FIG. 1.

Turning more specifically to FIG. 3, the control routine 140 includes an editing component 142 executable by the processor circuit 150 to interact with one or both of the controls 120 and the display 180 to visually present a configuration environment by which parameters of A/B tests are able to be provided to the configuration device 100 by an operator. As previously discussed, such parameters include indications of one or more of what visual areas in which variations of content presentation are to be tested, number of samples required, etc. Also among the parameters is an indication of the particular user behavior about which data samples are to be collected. Such desired behavior may include one or more of purchasing more products, "clicking thru" more advertisements, exploring more webpages of a website, reducing "bouncing" (e.g., where a user accesses a webpage, but then leaves it relatively quickly, rather than lingering there), downloading more files, sharing more information about themselves that may be used in marketing efforts, etc.

The control routine 140 also includes a generating component 144 to generate the interaction data 134 and the parameters data 137 based on the provided parameters via the editing component 142. As has been discussed, the interaction data 134 and the parameters data 137 are then provided to one or both of the server 400 and the control device 500 to direct the performance of the test by the server 400. Further, the communications component 149 may be employed to additionally provide the prior data 136 to one or both of the server 400 and the control device 500.

FIG. 3 additionally depicts an example of a visual portion of a configuration environment visually presented by the processor circuit 150 on the display 180, and by which an operator of the configuration device 100 provides at least some of the parameters for a test. In this depicted example, various "check boxes" are displayed enabling selection of various ways in which the duration of the test may be automatically altered. For example, a check box is included to allow an operator to enable the duration of the performance of the test to be automatically extended to allow an initial number of samples to be discarded automatically upon detection of the occurrence of a primacy effect or newness effect. Further, check boxes are provided to allow an operator to enable the test duration to be automatically shortened through use of Bayesian analysis recurringly performed as samples are collected of indications of user behavior in response to exposure to the various versions of the user interface that are tested. Still further, check boxes are provided to allow an operator to enable automatic notification of personnel (e.g., by automated sending of an email or text message) in the event of the test being ended early (e.g., through use of an alternative form of statistical analysis such as Bayesian analysis) or in the event of detection of a primacy or newness effect. It should be noted that despite the depiction of particular parameters to be entered and despite the depiction of the use of check boxes in this exemplary depiction of a visual portion of a configuration environment, other embodiments are possible in which different visual portions of a configuration environment enable entry of different combinations of parameters and/or in which other virtual controls than check boxes are used (e.g., "drop-down" menus, text entry boxes, etc.).

Figure 7:
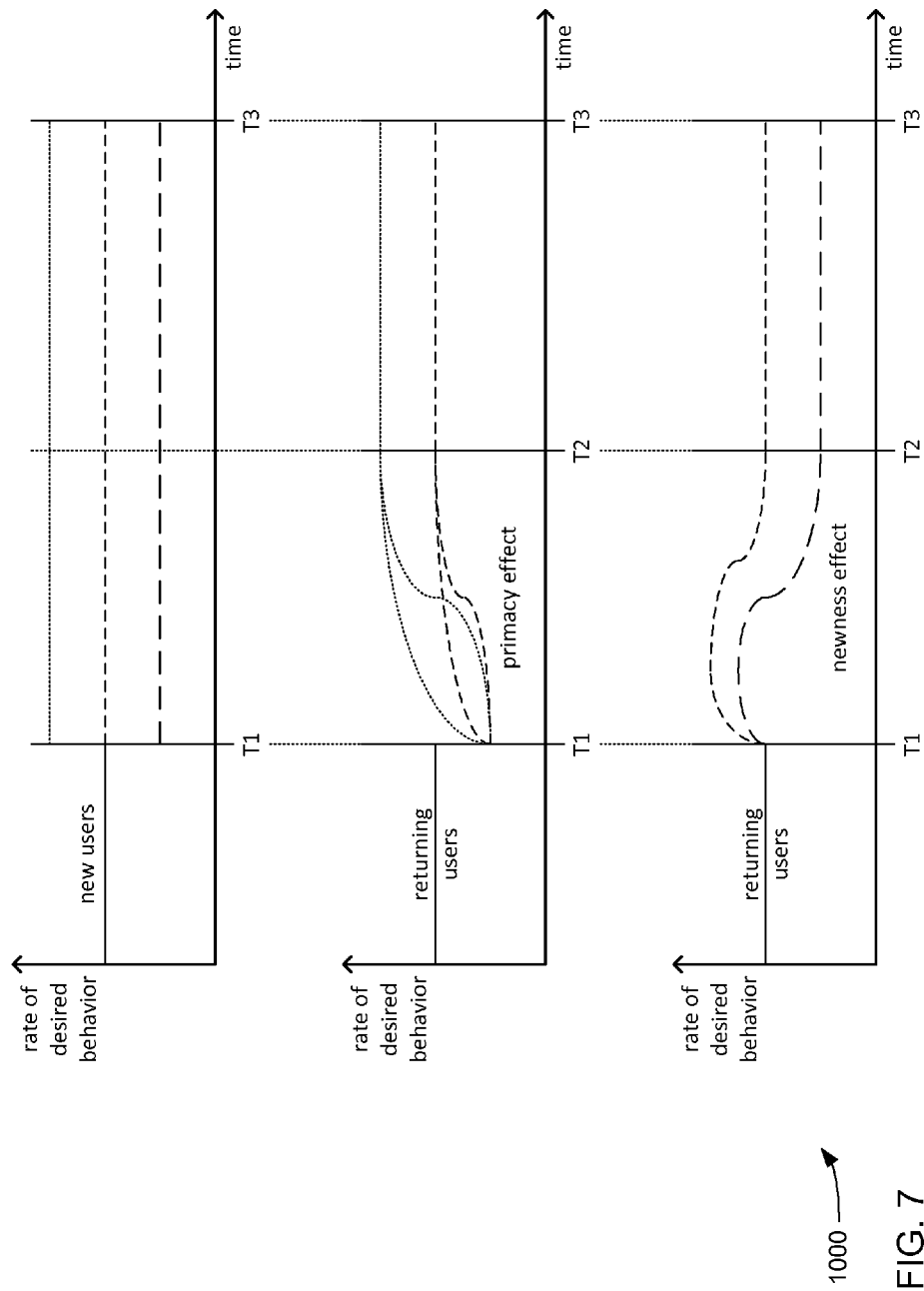
FIG. 7 illustrates an example of possible responses of new and returning users to a change in a user interface provided by the first embodiment.

As has been discussed, indications of whether or not to automatically provide notice of a primacy or newness effect, and/or whether or not to discard samples determined to be associated with a primacy or newness effect are possibly among the parameters that may be specified for a test. FIG. 7 illustrates comparative examples of primacy and newness effects on a behavior that is desired to be increased through the introduction of a proposed variation of an aspect of content presentation in a visual area of a visible portion of a user interface. It should be noted that FIG. 7 provides a somewhat simplistic version of samples of such behavior using relatively smooth lines—as those skilled in the art of collection of statistical data will readily recognize, there is usually a greater degree of variance in the measured values of such samples than is depicted here. Again, these simpler curves are presented to enable a comparative discussion.

As depicted, there can be a statistically significant difference in the responses of new users of a user interface that has been altered in some way and the responses of returning users to that same alteration. This arises from the fact that returning users are accustomed to the user interface as it was before the alteration was made, while by definition, new users have not prior experience with the user interface, and therefore have no basis to realize that an alteration has occurred. Therefore, for new users, the change in a particular behavior (e.g., buying a product, lingering longer to view content, "clicking through" advertisements, etc.) in response to the changed aspect of the user interface, would likely appear as a "step function" (shown as occurring at time T1, where the change is introduced) or similarly sudden change in behavior when graphed over time, presuming that the alteration to the user interface is such that behavior is affected. As depicted in FIG. 7, the change that may occur may be a positive change in which more of a desired behavior by new users results, or may be a negative change in which fewer new users are caused to engage in the desired behavior.

Unlike the simpler "step function" result that might be expected to be observed in samples of behavior of new users, initial samples of the behavior of returning users may provide a more complex and potentially misleading indication of the effects of an alteration to a user interface. A "primacy effect" is said to have occurred when a change in a user interface initially leads to returning users engaging in less of a desired behavior followed by a longer term rise in occurrences of that desired behavior as compared to that initial significant decrease, possibly returning to the same level of occurrences as before or to an increased level of occurrences of that desired behavior. A primacy effect often indicates that an initial degree of confusion among returning users has been caused by the change to the user interface due to the returning users having been accustomed to the user interface functioning in the manner in which it did before the change. Such changes as may cause the primacy effect tend to be functional changes to actions a user must take or information a user must be provide to perform some task through the user interface, rather than cosmetic changes (e.g., a change to a background color or a font size). Stated differently, the change has become a temporary hindrance to the usual behavior of returning users, and the returning users need time to adjust. A "newness effect" is said to have occurred when a change in a user interface initially leads to returning users engaging in significantly more of a desired behavior followed by a longer term fall in occurrences of that desired behavior as compared to that initial significant increase, possibly returning to the same level of occurrences as before. A newness effect often indicates that an initial curiosity has been stimulated among returning users by the change to the user interface such that returning users are engaged in an increase of in the desired behavior due to their curiosity leading them to explore the change. It may simply be that their explorations of the change results in lingering longer as they navigate about in the user interface, which may ultimately lead to more of the desired behavior (e.g., buying a product, etc.) simply as a result of spending more time interacting with whatever services are provided by the server through the now changed user interface. Stated differently, the change momentarily peaks the interest of returning users, but this increased level of interest then fades as the change becomes familiar to them.

Unfortunately, occurrences of either a primacy effect or a newness effect can significantly distort an initial number of samples among returning users, possibly rendering those samples useless for analysis to determine whether the alteration made to the user interface provides any positive effect longer term. To counteract such distortion, the controlling device 400 may discount a number of the initial samples upon detecting a newness or primacy effect in those initial samples from time T1 (where the change to the user interface is introduced) to time T2 (where it is determined by the controlling device 400 that the newness or primacy effect has ended). In so doing, the controlling device 400 automatically discards the distorted data, and subtracts that number of discarded samples from whatever count it maintains of received samples for that test. Unfortunately, this also has the effect of lengthening the duration of the test (e.g., time T3 at which the test ends due to collection of the required number samples is pushed further into the future)

since the discarded samples must now be replaced with more samples taken at a time following the detected end of the primacy or newness effect.

Figure 4:
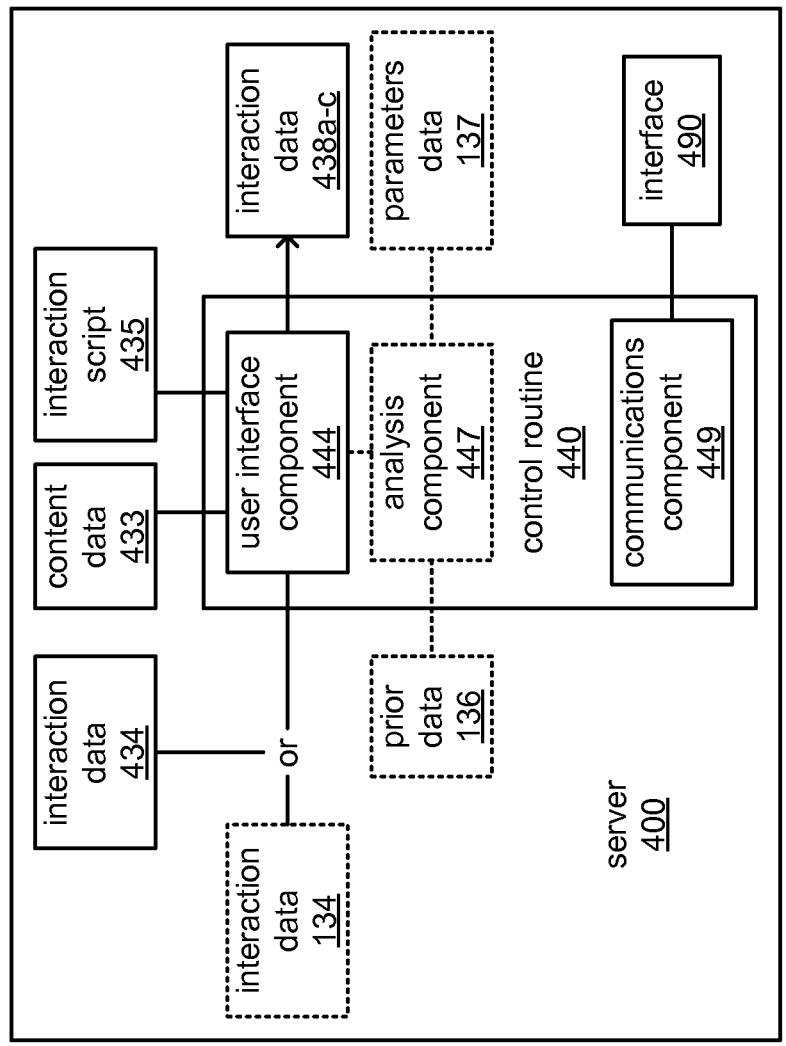

Turning to FIG. 4, the control routine 440 includes a user interface component 444 executable by the processor circuit 450 to employ one or the other of the interaction data 134 and 434, along with the interaction script 435 and the content data 433 to provide either a single version of a user interface to all of the interaction devices 800a-c during normal operation or to provide different randomly selected versions of the user interface to each of the interaction devices 800a-c as part of performing a test. However, as has also been described, it may be deemed desirable to avoid making a new random selection of one of the versions of the user interface each time the same one of the interaction devices 800a-c is operated to access the server 400 during performance of a test. Thus, as has been discussed, on the first occasion in which each of the interaction devices 800a-c is operated to access the server 400 while the server 400 is performing the test, a corresponding one of the persistent data 435a-c may be provided to each of the interaction devices 800a-c to be stored thereon and used to provide an indication during subsequent accesses to the server 400 of which one of the versions of the user interface was initially randomly selected to enable continued use of that version during the course of the test (or at least during the course of a current round of the test). Alternatively, as has also been discussed, the server 400 may maintain indications of the identities of each of the interaction devices 800a-c correlated with which version of the user interface was last provided to each.

As has been described, as part of providing whatever version of a user interface to each of the interaction devices 800a-c (either as part of performing the test, or during normal operation in which no test is underway), the server 400 transmits a corresponding one of the interaction data 438a-c to each of the interaction devices 800a-c. The interaction data 438a-c includes one or both of content to be visually displayed in one or more visual areas of a visible portion of a user interface, and indications of the manner in which that content is to be presented within them.

Figure 5:
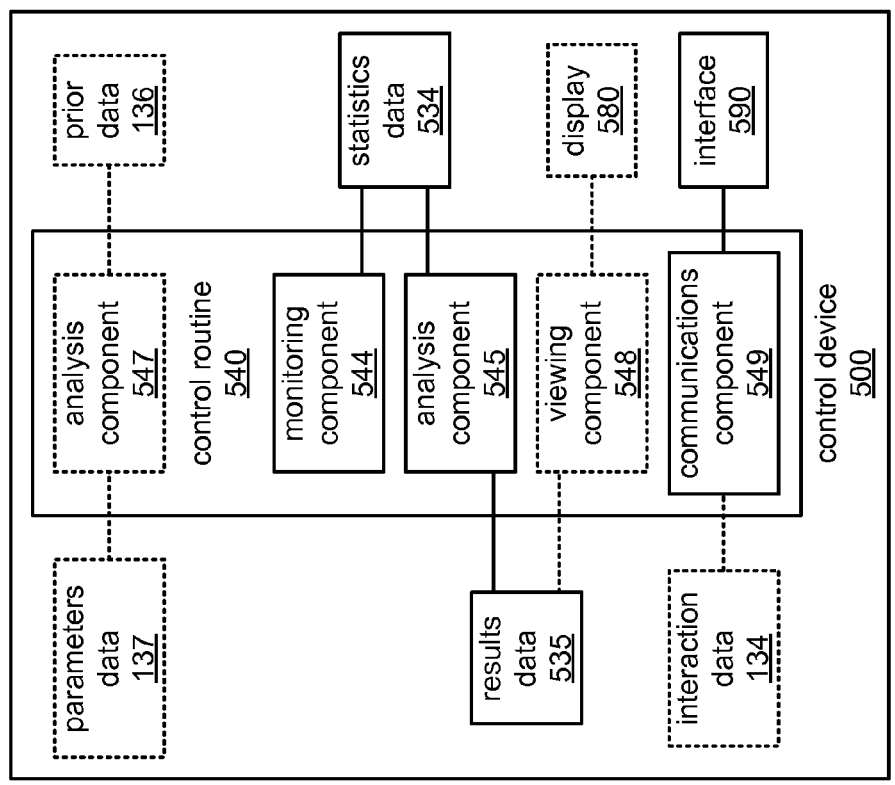

Turning more specifically to FIG. 5, the control routine 540 includes a monitoring component 544 executable by the processor circuit 550 to receive indications of observed user behavior from the server 400 and store metrics of that behavior in response to each of the versions of user interface provided by the server 400 as the statistics data 534. It is in this sense that the server 400 and/or the control device 500 "collect" the "samples" of user behavior that become inputs to both classical and alternative forms of statistical analysis. As has been discussed, the metrics may represent indications of instances of any of a variety of user behaviors selected to be monitored, including and not limited to, viewing time spent at a given webpage or other visual presentation of content, bounces in which a user visits a webpage or other visual presentation of a portal only briefly, instances of "clicking through" a visual presentation of an advertisement, frequency of use of a service provided by the server 400, etc. The control routine 540 also includes an analysis component 545 to parse the statistics data 534 to analyze the received metrics stored therein to determine the degree of success of one or more versions of the user interface in bringing about a desired behavior on the part of users, and storing the results of the analysis as the results data 535. In some embodiments, the control routine 540 may further include a viewing component 548 executable by the processor circuit 550 to visually present the results data 535 on a display 580 of the monitoring device 500, possibly in graphical form. Further, the communications component 549 may be employed to receive the interaction data 134, and then provide portions of the interaction data 134 to the server 400 as needed by the server 400 to provide different versions of a user interface to different ones of the interaction devices 800a-c as part of performing a test.

Referring back to both FIGS. 4 and 5, one or the other of the control routine 440 of the server 400 or the control routine 540 of the control device 500 incorporates an analysis component 447 or 547, respectively. This analysis component 447 or 547 is executable by the processor circuit 450 or 550, respectively, to employ the prior data 136 and the parameters data 137 to recurringly perform an alternative statistical analysis to control performance of the test by the server 400. As has been discussed, the prior data 136 may be employed as an input to the alternative statistical analysis, and the parameters data 137 may specify whether a test may be automatically terminated early, whether one or more versions of a user interface incorporating proposed variations in content presentation may be automatically culled from the test, and/or whether the duration of the test may be automatically extended in response to detecting instances of newness or primacy in user reactions to exposure to different versions of the user interface.

As has been discussed, it may be that the analysis component 447 or 547, in recurringly performing the alternative statistical analysis, determines that one of the proposed versions of the user interface elicits a statistically significant degree of desired change in user behavior such that it is a clear improvement over a current version. In such a situation, depending on whether it is indicated as permitted in the parameters data 137, the analysis component 447 or 547 may terminate the test early, and may cause the server 400 to immediately commence performance of another test.

Alternatively or additionally, as has been discussed, it may be that the analysis component 447 or 547, in recurringly performing the alternative statistical analysis, determines that one of the proposed versions of the user interface elicits no statistically significant degree of change in user behavior, or elicits a statistically significant undesirable change in user behavior, such that continuing to test that version would only waste valuable time. In such a situation, depending on whether it is indicated as permitted in the parameters data 137, the analysis component 447 or 547 may cull that version from the test, thereby shortening the remaining duration of the test by removing the need to continue collecting samples associated with testing that version.

In yet another alternative, it may be that the analysis component 447 or 547, in recurringly performing the alternative statistical analysis, determines that none of the proposed versions of the user interface is likely to be found to elicit a statistically significant degree of change in user behavior such that it appears that all of the proposed versions being tested provide no statistically significant improvement over the current version. In such a situation, depending on whether it is indicated as permitted in the parameters data 137, the analysis component may terminate the entire test early. However, it may be that such early termination is indicated in the parameters data 137 as not being permitted in order to allow the collecting of sufficient samples to enable the performance of the classical statistical analysis to at least verify such a determination made through recurring performance of the alternative statistical analysis. As has been discussed, it may be deemed desirable to continue with the performance of a test under such circumstances to verify the validity of a model of user behavior on which the prior data 136 may be based.

Figure 6:
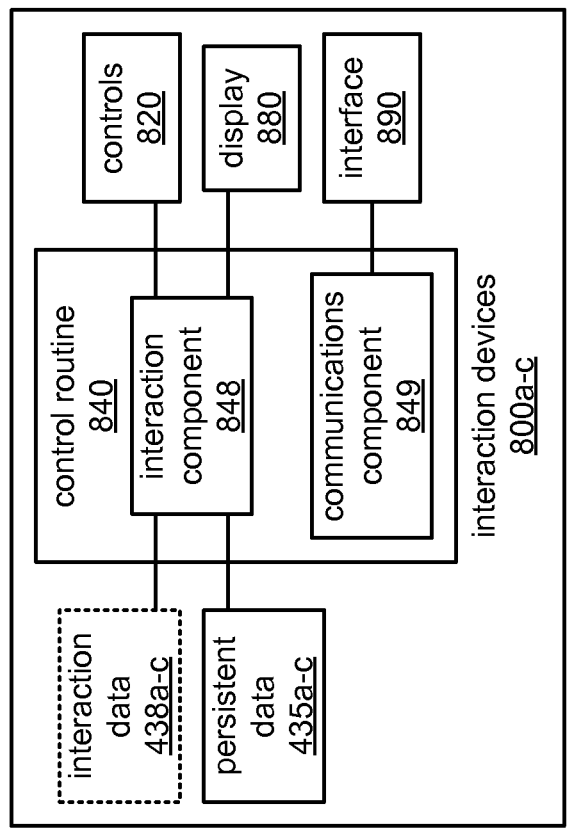

Turning more specifically to FIG. 6, the control routine 840 comprises an interaction component 848 executable by the processor circuit 840 to interact with one or both of the controls 820 and the display 880 to visually present the viewable portion of whatever version of user interface is provided by the server 400. As has been discussed, each of the interaction devices 800*a-c* receives a corresponding one of the interaction data 438*a-c* made up of one or both of content to visually presented in the viewable portion of the user interface on the display 880, and indications of definitions of one or more visual areas of that viewable portion of the user interface in which to present that content, as well as aspects of the manner in which that content is to be presented in the one or more visual areas.

As has been previously discussed, in some embodiments, one or more of the interaction devices 800*a-c* may also receive a corresponding one of the persistent data 435*a-c* from the server 400 indicating which of the versions of the user interface selected for the test has been randomly selected for the one of the interaction devices 800*a-c* in which that corresponding one of the persistent data 435*a-c* is stored. In such embodiments, the processor circuit 850 is caused to transmit an indication of the randomly selected version of user interface indicated in its corresponding one of the persistent data 435*a-c* to the server 400 when operated to access the server 400 to cause the server 400 to continue to provide that same version of the user interface for as long as the test (or a specific round of the test) continues to be performed by the server 400.

Figure 8:
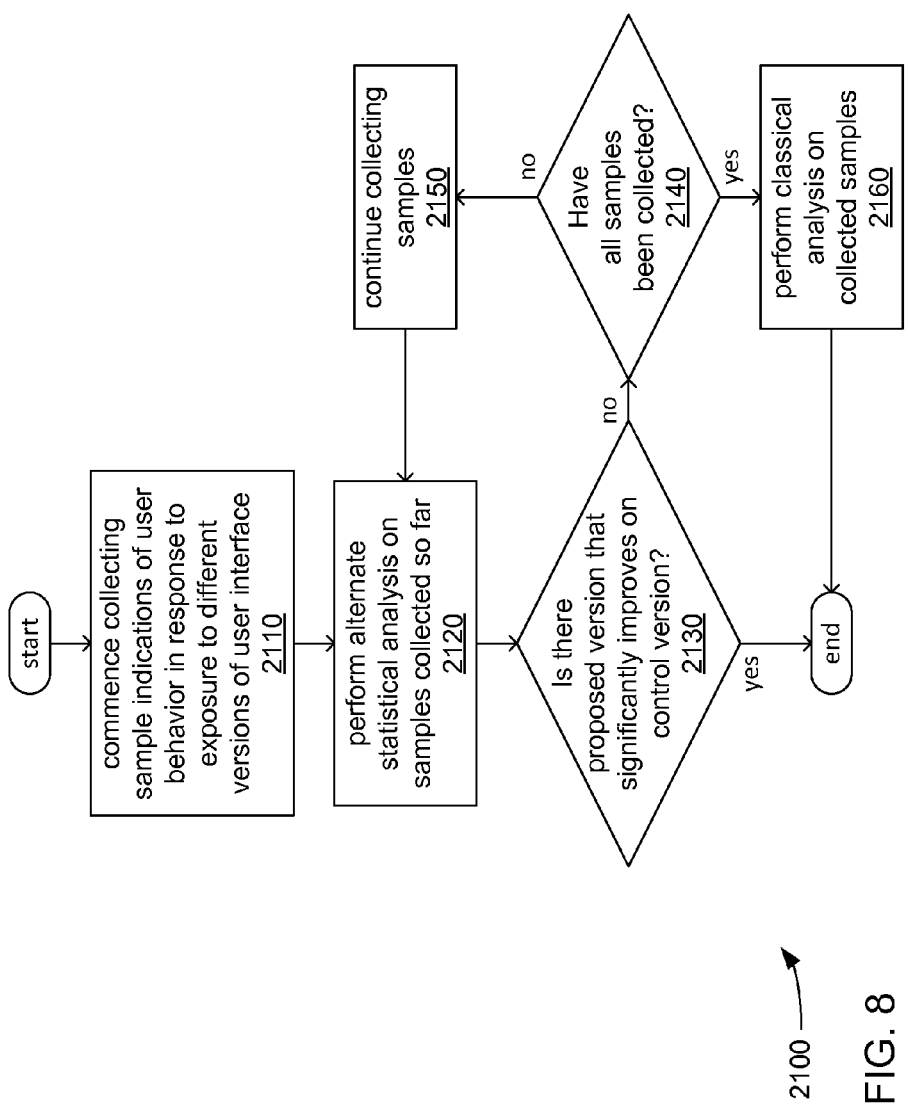
FIG. 8 illustrates an embodiment of a first logic flow.

FIG. 8 illustrates an embodiment of a logic flow 2100. The logic flow 2100 may be representative of some or all of the operations executed by one or more embodiments described herein. More specifically, the logic flow 2100 may illustrate operations performed by components of the server 400 and/or the control device 500, including the processor circuits 450 and/or 550 in executing at least the control routine 440, the control routine 540, and/or other components of either of the server 400 or the control device 500.

At 2110, a computing device (e.g., the server 400 or the control device 500 controlling the server 400) commences collecting sample indications of user behavior in response to exposure to different versions of a user interface during a test. As has been discussed, a server normally provides services through a portal (e.g., a website) using a single version of a user interface provided to multiple interaction devices (e.g., the interaction devices 800*a-c*). However, during a test of one or more proposed versions of the user interface in which one or more variations or combinations of variations of the manner in which content is presented are tested, the server is caused to randomly provide different versions of the user interface (one of which is the original version used as a control) to different interaction devices.

At 2120, the computing device recurringly performs an alternate statistical analysis on whatever samples have been collected so far. As has been discussed, such an alternate statistical analysis may be Bayesian analysis.

At 2130, a check is made as to whether there is a proposed version of the user interface that has been determined by the alternate statistical analysis to show a statistically significant improvement over the control version? If there is, then testing may be terminated early without completing collection of all of the samples necessary to perform classical statistical analysis (e.g., NHST) with the level of certainty specified at the start of the test.

However, if at 2130, no such proposed version has yet been identified via the alternative statistical analysis, then a check is made at 2140 as to whether all of the samples required for the classical statistical analysis have yet been collected. If all of such samples have been collected, then the classical statistical analysis is performed on the samples at 2160, and the test terminates. However, if at 2140, not all of the samples have yet been collected, then the collecting of samples continues at 2150, and the alternative analysis continues to be recurringly performed at 2120.

Figure 9:
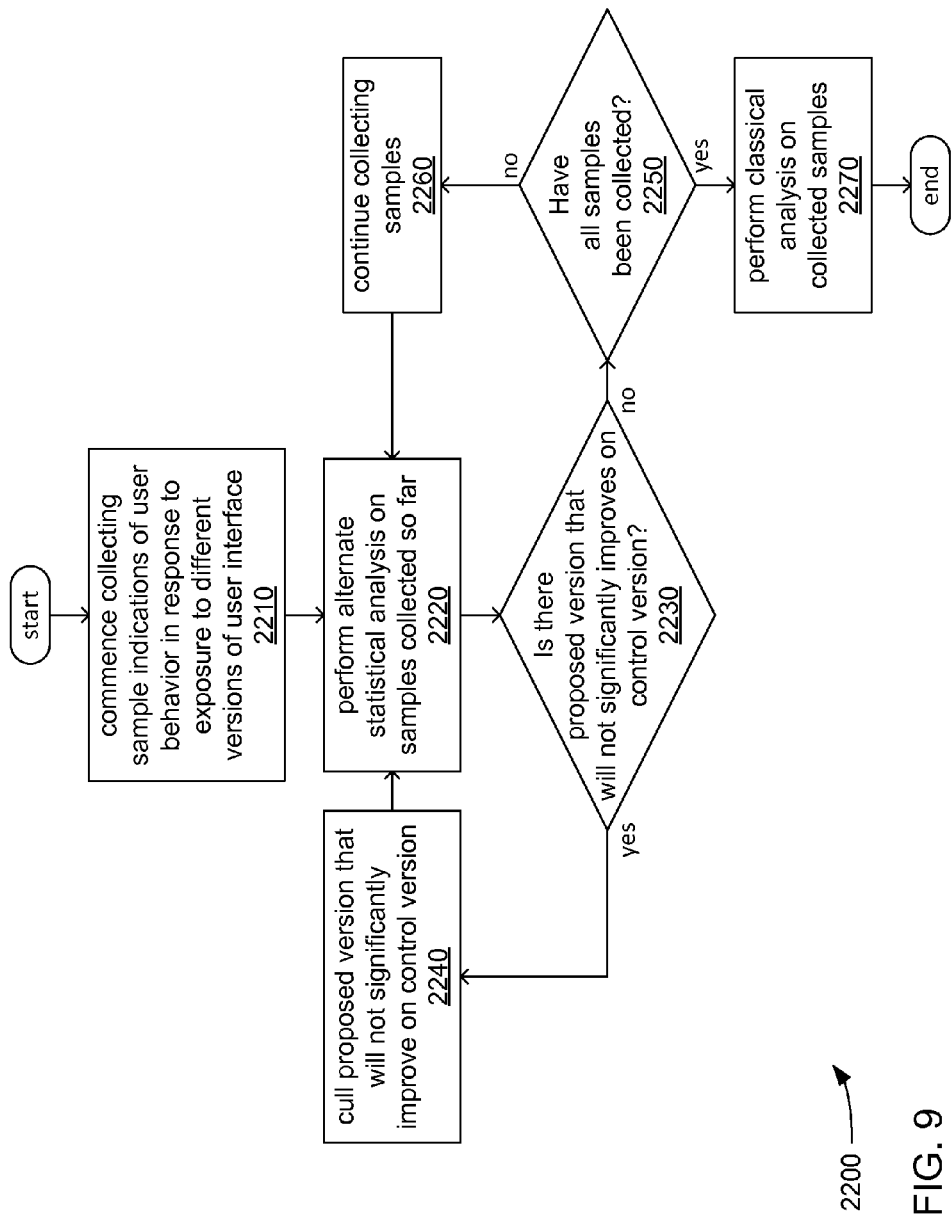
FIG. 9 illustrates an embodiment of a second logic flow.

FIG. 9 illustrates an embodiment of a logic flow 2200. The logic flow 2200 may be representative of some or all of the operations executed by one or more embodiments described herein. More specifically, the logic flow 2200 may illustrate operations performed by components of the server 400 and/or the control device 500, including the processor circuits 450 and/or 550 in executing at least the control routine 440, the control routine 540, and/or other components of either of the server 400 or the control device 500.

At 2210, a computing device (e.g., the server 400 or the control device 500 controlling the server 400) commences collecting sample indications of user behavior in response to exposure to different versions of a user interface during a test. As has been discussed, during a test of one or more proposed versions of a user interface a server is caused to randomly provide different versions of the user interface (one of which is the original version used as a control) to different interaction devices. Further, at least a specified number of samples required to enable performance of a classical statistical analysis (e.g., NHST) with a specified level of certainty is meant to be collected.

At 2220, the computing device recurringly performs an alternate statistical analysis on whatever samples have been collected so far. As has been discussed, such an alternate statistical analysis may be Bayesian analysis.

At 2230, a check is made as to whether there is a proposed version of the user interface that has been determined by the alternate statistical analysis to be statistically likely to show no statistically significant improvement over the control version? If there is, then that version is culled from the test at 2240, and the alternative analysis continues to be recurringly performed at 2220.

However, if at 2230, no such proposed version has yet been identified via the alternative statistical analysis, then a check is made at 2250 as to whether all of the samples required for the classical statistical analysis have yet been collected. If all of such samples have been collected, then the classical statistical analysis is performed on the samples at 2270, and the test terminates. However, if at 2250, not all of the samples have yet been collected, then the collecting of samples continues at 2260, and the alternative analysis continues to be recurringly performed at 2220.

Figure 10:
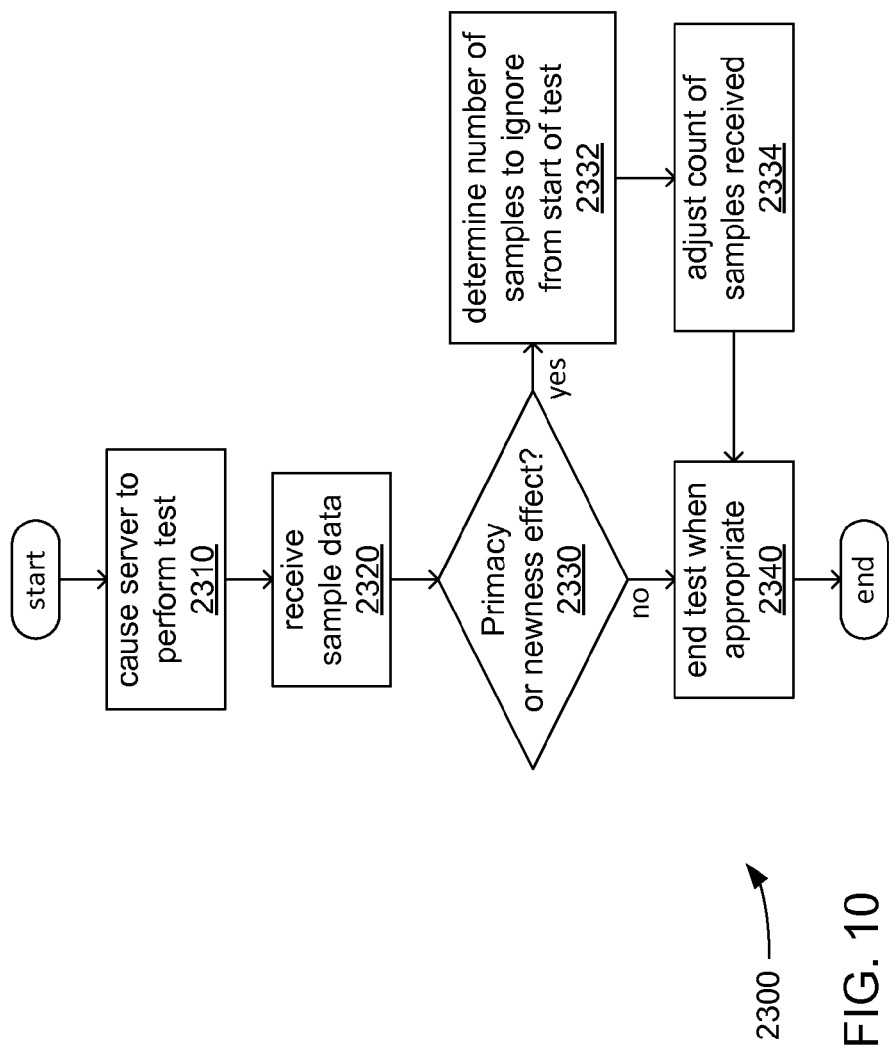
FIG. 10 illustrates an embodiment of a third logic flow.

FIG. 10 illustrates an embodiment of a logic flow 2300. The logic flow 2300 may be representative of some or all of the operations executed by one or more embodiments described herein. More specifically, the logic flow 2300 may illustrate operations performed by components of the server 400 and/or the control device 500, including the processor circuits 450 and/or 550 in executing at least the control routine 440, the control routine 540, and/or other components of either of the server 400 or the control device 500.

At 2310, a controlling device (e.g., the controlling device 400) triggers a server (e.g., the server 500) to perform an A/B test of a user interface, and at 2320, the controlling device receives sample data from the server's performance of that test. As has been discussed, the controlling device 400 provides the server 500 with an appropriate one of the executable script 134a-x as part of causing the server 500 to perform the test corresponding to that one of the executable script 134a-x.

At 2330, a check is made by the controlling device as to whether the initial samples received from the server indicate either a primacy or newness effect among the returning users of whatever services are provided by the server through the user interface being tested. If so, then the controlling device determines the number of initial samples (e.g., samples received from the start of the test, onward) received from the server that are to be ignored at 2332, and then adjusts the count of samples received at 2334 as part of extending the duration of the test to cause the receipt of samples to replace the initial ones that are now to be ignored, before ending the test when appropriate at 2340.

However, if no primacy or newness effects are observed at 2330, then the controlling device ends the test when appropriate (e.g., when a required number samples are received) at 2340. As has been discussed, the controlling device may then act to select another test to started, and cause the server to begin performance of that newly selected test.

Figure 11:
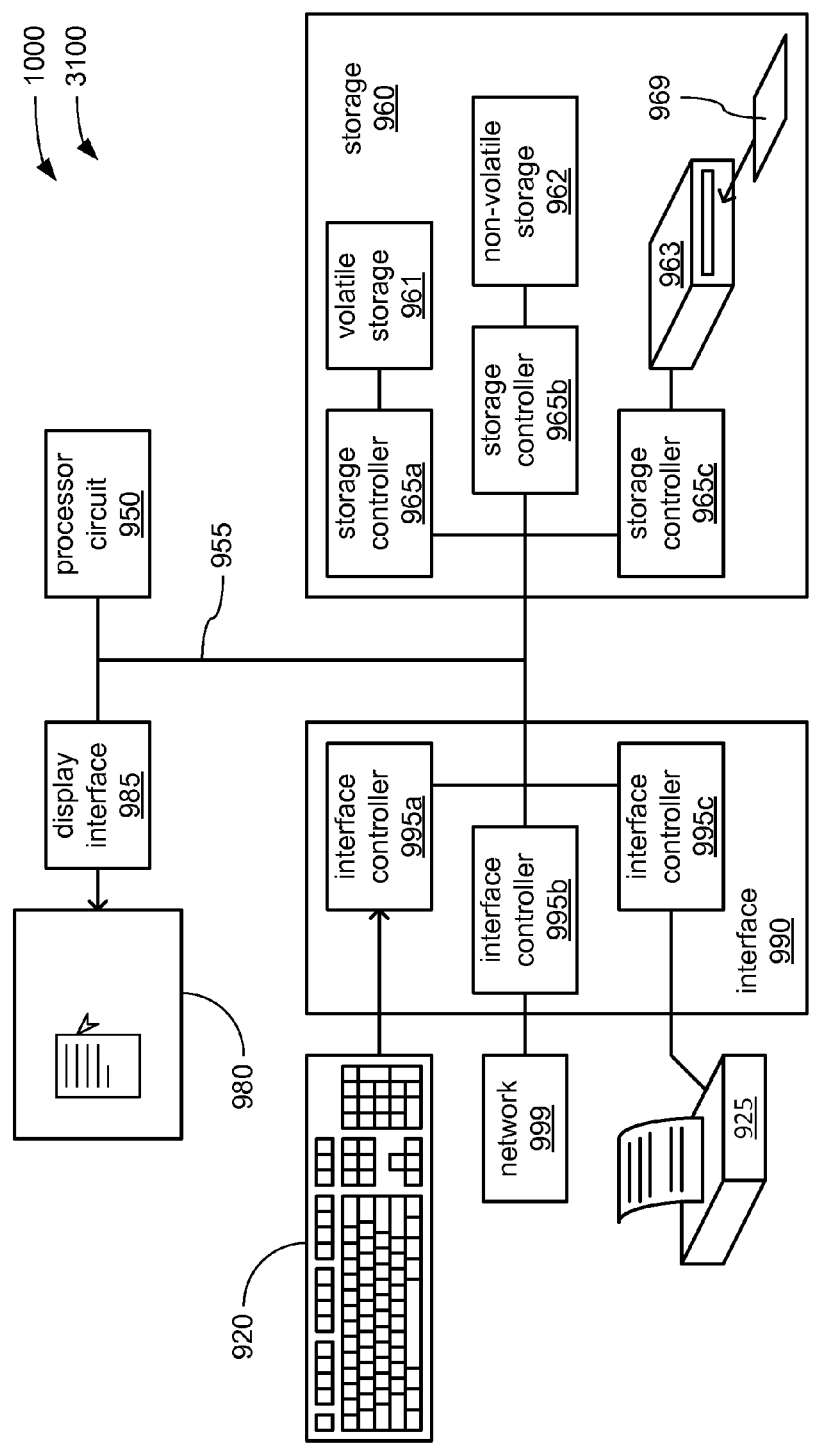
FIG. 11 illustrates an embodiment of a processing architecture.

FIG. 11 illustrates an embodiment of an exemplary processing architecture 3100 suitable for implementing various embodiments as previously described. More specifically, the processing architecture 3100 (or variants thereof) may be implemented as part of one or more of the computing devices 100, 400, 500 and 800a-c. It should be noted that components of the processing architecture 3100 are given reference numbers in which the last two digits correspond to the last two digits of reference numbers of components earlier depicted and described as part of each of these computing devices. This is done as an aid to correlating such components of whichever ones of these computing devices may employ this exemplary processing architecture in various embodiments.

The processing architecture 3100 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor circuit, the processor circuit itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 3100, a computing device comprises at least a processor circuit 950, a storage 960, an interface 990 to other devices, and coupling 955. As will be explained, depending on various aspects of a computing device implementing the processing architecture 3100, including its intended use and/or conditions of use, such a computing device may further comprise additional components, such as without limitation, a display interface 985.

Coupling 955 is comprised of one or more buses, point-to-point interconnects, transceivers, buffers, crosspoint switches, and/or other conductors and/or logic that communicatively couples at least the processor circuit 950 to the storage 960. Coupling 955 may further couple the processor circuit 950 to one or more of the interface 990 and the display interface 985 (depending on which of these and/or other components are also present). With the processor circuit 950 being so coupled by couplings 955, the processor circuit 950 is able to perform the various ones of the tasks described at length, above, for whichever ones of the computing devices 100, 400, 500 or 800a-c implement the processing architecture 3100. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor circuit 950 (corresponding to one or more of the processor circuits 150, 450, 550 or 850) may comprise any of a wide variety of commercially available processors, employing any of a wide variety of technologies and implemented with one or more cores physically combined in any of a number of ways.

As previously discussed, the storage 960 (corresponding to one or more of the storages 160, 460, 560 or 860) may comprise one or more distinct storage devices based on any of a wide variety of technologies or combinations of technologies. More specifically, as depicted, the storage 960 may comprise one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly comprising multiple distinct types of storage is in recognition of the commonplace use of more than one type of storage device in computing devices in which one type provides relatively rapid reading and writing capabilities enabling more rapid manipulation of data by the processor circuit 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and comprises one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and comprises one or more optical and/or solid-state disk drives employing one or more pieces of machine-readable storage media 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage media 969.

One or the other of the volatile storage 961 or the non-volatile storage 962 may comprise an article of manufacture in the form of a machine-readable storage media on which a routine comprising a sequence of instructions executable by the processor circuit 950 may be stored, depending on the technologies on which each is based. By way of example, where the non-volatile storage 962 comprises ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to removable storage media such as a floppy diskette. By way of another example, the non-volatile storage 962 may comprise banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor circuit 950 may initially be stored on the machine-readable storage media 969, and the removable media storage 963 may be subsequently employed in copying that routine to the non-volatile storage 962 for longer term storage not requiring the continuing presence of the machine-readable storage media 969 and/or the volatile storage 961 to enable more rapid access by the processor circuit 950 as that routine is executed.

As previously discussed, the interface 990 (corresponding to one or more of the interfaces 190, 490, 590 and 890) may employ any of a variety of signaling technologies corresponding to any of a variety of communications technologies that may be employed to communicatively couple a computing device to one or more other devices. Again, one or both of various forms of wired or wireless signaling may be employed to enable the processor circuit 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995a, 995b and 995c. The interface controller 995a may employ any of a variety of types of wired digital serial interface or radio frequency wireless interface to receive serially transmitted messages from user input devices, such as the depicted keyboard 920 (perhaps corresponding to one or more of the controls 120 and 820). The interface controller 995b may employ any of a variety of cabling-based or wireless signaling, timings and/or protocols to access other computing devices through the depicted network 999 (perhaps a network comprising one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually comprises) a display (e.g., the depicted example display 980, corresponding to one or more of the displays 180 and 880), such a computing device implementing the processing architecture 3100 may also comprise the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the devices 100, 400, 500 and 800a-c may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example of an apparatus includes a processor circuit; and logic to commence collection of a specified number of samples of user responses to multiple versions of a user interface in a test, employ an alternative statistical analysis to analyze the samples as the samples are collected, determine whether a proposed version of the multiple versions elicits a statistically significant improvement in user response over a control version of the multiple versions, terminate the test before the specified number of samples are collected in response to a statistically significant improvement over the control version elicited by the proposed version, and complete collection of the specified number of samples and employ a classical statistical analysis to analyze the samples in response to the proposed version not eliciting the statistically significant improvement.

The above example of an apparatus in which the logic is to transmit interaction data conveying different versions of the user interface to each of multiple interaction devices operated by different users to perform the test.

Either of the above examples of an apparatus in which the alternative statistical analysis includes Bayesian analysis and the classical statistical analysis includes null-hypothesis significance test (NHST).

Any of the above examples of an apparatus in which the proposed version includes a variation of a manner in which content is visually presented in the control version.

Any of the above examples of an apparatus in which the logic is to employ the alternative statistical analysis to determine whether the proposed version is statistically likely to elicit a statistically significant improvement in user response over the control version, and cull the proposed version from the test to shorten a duration of the test in response to a determination that the proposed version is statistically unlikely to elicit a statistically significant improvement in user response over the control version.

Any of the above examples of an apparatus in which the logic is to employ the alternative statistical analysis to determine whether any proposed version of the multiple versions is statistically likely to elicit a statistically significant improvement in user response over the control version, and terminate the test before the specified number of samples are collected in response to a determination that no proposed version of the multiple versions is statistically likely to elicit a statistically significant improvement in user response over the control version.

Any of the above examples of an apparatus in which the logic is to analyze initial ones of the samples for an occurrence of one of a primacy effect and a newness effect, discard the initial ones of the samples based on detection of an occurrence of one of a primacy effect and a newness effect, and extend a duration of the test to replace the initial ones of the samples with additional samples based on detection of an occurrence of one of a primacy effect and a newness effect.

Any of the above examples of an apparatus in which the improvement in user response includes at least one of clicking through more advertisements, exploring more webpages of a website, reducing bouncing, downloading more files, and sharing more information.

An example of another apparatus includes a processor circuit; and logic to commence collection of a specified number of samples of user responses to multiple versions of a user interface in a test, employ an alternative statistical analysis to analyze the samples as the samples are collected, determine whether a proposed version of the multiple versions is statistically likely to elicit a statistically significant improvement in user response over a control version of the multiple versions, cull the proposed version from the test to shorten a duration of the test in response to a determination that the proposed version is statistically unlikely to elicit a statistically significant improvement in user response over the control version, and complete collection of the specified number of samples and employ a classical statistical analysis to analyze the samples in response to the proposed version not eliciting the statistically significant improvement.

The above example of another apparatus in which the logic is to transmit interaction data conveying different versions of the user interface to each of multiple interaction devices operated by different users to perform the test.

Either of the above examples of another apparatus in which the alternative statistical analysis includes Bayesian analysis and the classical statistical analysis includes null-hypothesis significance test (NHST).

Any of the above examples of another apparatus in which the logic is to employ the alternative statistical analysis to determine whether the proposed version elicits a statistically significant improvement in user response over the control version, and terminate the test before the specified number of samples are collected in response to a statistically significant improvement over the control version elicited by the proposed version.

Any of the above examples of another apparatus in which the logic is to employ the alternative statistical analysis to determine whether any proposed version of the multiple versions is statistically likely to elicit a statistically significant improvement in user response over the control version, and terminate the test before the specified number of samples are collected in response to a determination that no proposed version of the multiple versions is statistically likely to elicit a statistically significant improvement in user response over the control version.

Any of the above examples of another apparatus in which the logic is to analyze initial ones of the samples for an occurrence of one of a primacy effect and a newness effect, discard the initial ones of the samples based on detection of an occurrence of one of a primacy effect and a newness effect, and extend a duration of the test to replace the initial ones of the samples with additional samples based on detection of an occurrence of one of a primacy effect and a newness effect.

Any of the above examples of another apparatus in which the logic is to compare results of the classical statistical analysis to results of the alternative statistical analysis, and determine whether a model of user behavior employed as a prior data input to the alternative analysis is valid.

An example of a computer-implemented method includes transmitting interaction data conveying different versions of a user interface to each of multiple interaction devices operated by different users to perform a test, commencing collection of a specified number of samples of user responses to the multiple versions of the user interface, analyzing the samples as the samples are collected using Bayesian analysis, determining whether a proposed version of the multiple versions elicits a statistically significant improvement in user response over a control version of the multiple versions, terminating the test before the specified number of samples are collected in response to the proposed version eliciting a statistically significant improvement over the control version, and completing collection of the specified number of samples and analyzing the samples using NHST in response to the proposed version not eliciting the statistically significant improvement.

The above example of a computer-implemented method in which the proposed version includes a variation of a manner in which content is visually presented in the control version.

Either of the above examples of a computer-implemented method in which the method includes employing Bayesian analysis to determine whether the proposed version is statistically likely to elicit a statistically significant improvement in user response over the control version, and culling the proposed version from the test to shorten a duration of the test in response to determining that the proposed version is statistically unlikely to elicit a statistically significant improvement in user response over the control version.

Any of the above examples of a computer-implemented method in which the method includes employing Bayesian analysis to determine whether any proposed version of the multiple versions is statistically likely to elicit a statistically significant improvement in user response over the control version, and terminating the test before the specified number of samples are collected in response to determining that no proposed version of the multiple versions is statistically likely to elicit a statistically significant improvement in user response over the control version.

Any of the above examples of a computer-implemented method in which the method includes discarding the initially collected ones of the samples based on detecting an occurrence of one of a primacy effect and a newness effect, and extending a duration of the test to replace the initial ones of the samples with additional samples based on detection of an occurrence of one of a primacy effect and a newness effect.

Any of the above examples of a computer-implemented method in which the improvement in user response includes at least one of clicking through more advertisements, exploring more webpages of a website, reducing bouncing, downloading more files, and sharing more information.

Any of the above examples of a computer-implemented method in which the method includes comparing results of the NHST analysis to results of the Bayesian analysis, and determining whether a model of user behavior employed as a prior data input to the Bayesian analysis is valid.

An example of at least one machine-readable storage medium includes instructions that when executed by a computing device, cause the computing device to transmit interaction data conveying different versions of a user interface to each of multiple interaction devices operated by different users to perform a test, commence collection of a specified number of samples of user responses to the multiple versions of the user interface, analyze the samples as the samples are collected using Bayesian analysis, determine whether a proposed version of the multiple versions elicits a statistically significant improvement in user response over a control version of the multiple versions, terminate the test before the specified number of samples are collected in response to the proposed version eliciting a statistically significant improvement over the control version, and complete collection of the specified number of samples and analyze the samples using NHST in response to the proposed version not eliciting the statistically significant improvement.

The above example of at least one machine-readable storage medium in which the computing device is caused to employ Bayesian analysis to determine whether the proposed version is statistically likely to elicit a statistically significant improvement in user response over the control version, and cull the proposed version from the test to shorten a duration of the test in response to determining that the proposed version is statistically unlikely to elicit a statistically significant improvement in user response over the control version.

Either of the above examples of at least one machine-readable storage medium in which the computing device is caused to employ Bayesian analysis to determine whether any proposed version of the multiple versions is statistically likely to elicit a statistically significant improvement in user response over the control version, and terminate the test before the specified number of samples are collected in response to determining that no proposed version of the multiple versions is statistically likely to elicit a statistically significant improvement in user response over the control version.

Any of the above examples of at least one machine-readable storage medium in which the computing device is caused to discard the initially collected ones of the samples based on detecting an occurrence of one of a primacy effect and a newness effect, and extend a duration of the test to replace the initial ones of the samples with additional samples based on detection of an occurrence of one of a primacy effect and a newness effect.

Any of the above examples of at least one machine-readable storage medium in which the computing device is caused to compare results of the NHST analysis to results of the Bayesian analysis, and determine whether a model of user behavior employed as a prior data input to the Bayesian analysis is valid.

The invention claimed is:

1. An apparatus comprising:
a processor circuit; and
logic to:
commence collection of a specified number of samples of user responses to multiple versions of a user interface in a test of the multiple versions of the user interface, wherein a sample of a user response comprises an action taken with respect to a version of the user interface;
analyze initial ones of the samples for an occurrence of one of a primacy effect or a newness effect, a primacy effect indicated by a statistically significant decrease, at a change in the user interface, in a desired user response from returning users followed by a longer term rise in occurrences of that desired user response as compared to the initial statistically significant decrease, and a newness effect indicated by a statistically significant increase, at a change in the user interface, in a desired user response from returning users followed by a longer term fall in occurrences of the desired user response as compared to that initial significant increase;
discard the initial ones of the samples based on detection of an occurrence of one of a primacy effect or a newness effect;
employ an alternative statistical analysis to analyze the samples which were not discarded as the samples are collected;
determine whether a proposed version of the multiple versions elicits a statistically significant change in a sampled action over a control version of the multiple versions;
terminate the test before the specified number of samples are collected in response to a statistically significant change over the control version elicited by the proposed version; and
complete collection of the specified number of samples and employ a classical statistical analysis to analyze the samples in response to the proposed version not eliciting the statistically significant change.

2. The apparatus of claim 1, the logic to transmit interaction data conveying different versions of the user interface to each of multiple interaction devices operated by different users to perform the test.

3. The apparatus of claim 1, the alternative statistical analysis comprising Bayesian analysis and the classical statistical analysis comprising null-hypothesis significance test (NHST).

4. The apparatus of claim 1, the proposed version comprising a variation of a manner in which content is visually presented in the control version.

5. The apparatus of claim 1, the logic to:
employ the alternative statistical analysis to determine whether the proposed version is statistically likely to elicit a statistically significant increase in a sampled action over the control version; and
cull the proposed version from the test to shorten a duration of the test in response to a determination that the proposed version is statistically unlikely to elicit a statistically significant increase in the sampled action over the control version.

6. The apparatus of claim 1, the logic to:
employ the alternative statistical analysis to determine whether any proposed version of the multiple versions is statistically likely to elicit a statistically significant increase in a sampled action over the control version; and
terminate the test before the specified number of samples are collected in response to a determination that no proposed version of the multiple versions is statistically likely to elicit a statistically significant increase in the sampled action over the control version.

7. The apparatus of claim 1, the logic to:
extend a duration of the test to replace the initial ones of the samples with additional samples based on detection of an occurrence of one of a primacy effect or a newness effect.

8. The apparatus of claim 1, the change in user response comprising at least one of clicking through more advertisements, exploring more webpages of a website, reducing bouncing, downloading more files, or sharing more information.

9. An apparatus comprising:
a processor circuit; and
logic to:
commence collection of a specified number of samples of user responses to multiple versions of a user interface in a test of the multiple versions of the user interface, wherein a sample of a user response comprises an action taken with respect to a version of the user interface;
analyze initial ones of the samples for an occurrence of one of a primacy effect or a newness effect, a primacy effect indicated by a statistically significant decrease, at a change in the user interface, in a desired user response from returning users followed by a longer term rise in occurrences of that desired user response as compared to the initial statistically significant decrease, and a newness effect indicated by a statistically significant increase, at a change in the user interface, in a desired user response from returning users followed by a longer term fall in occurrences of the desired user response as compared to that initial significant increase;
discard the initial ones of the samples based on detection of an occurrence of one of a primacy effect or a newness effect;
employ an alternative statistical analysis to analyze the samples which were not discarded as the samples are collected;
determine whether a proposed version of the multiple versions is statistically likely to elicit a statistically significant change in a sampled action over a control version of the multiple versions;
cull the proposed version from the test to shorten a duration of the test in response to a determination that the proposed version is statistically unlikely to elicit a statistically significant change in user response over the control version; and complete collection of the specified number of samples and employ a classical statistical analysis to analyze the samples in response to the proposed version not eliciting the statistically significant change.

10. The apparatus of claim 9, the logic to transmit interaction data conveying different versions of the user interface to each of multiple interaction devices operated by different users to perform the test.

11. The apparatus of claim 9, the alternative statistical analysis comprising Bayesian analysis and the classical statistical analysis comprising null-hypothesis significance test (NHST).

12. The apparatus of claim 9, the logic to:
employ the alternative statistical analysis to determine whether the proposed version elicits a statistically significant increase in a sampled action over the control version; and
terminate the test before the specified number of samples are collected in response to a statistically significant increase in the sampled action over the control version elicited by the proposed version.

13. The apparatus of claim 9, the logic to:
employ the alternative statistical analysis to determine whether any proposed version of the multiple versions is statistically likely to elicit a statistically significant increase in a sampled action over the control version; and
terminate the test before the specified number of samples are collected in response to a determination that no proposed version of the multiple versions is statistically likely to elicit a statistically significant increase in the sampled action over the control version.

14. The apparatus of claim 9, the logic to:
extend a duration of the test to replace the initial ones of the samples with additional samples based on detection of an occurrence of one of a primacy effect or a newness effect.

15. The apparatus of claim 9, the logic to:
compare results of the classical statistical analysis to results of the alternative statistical analysis; and
determine whether a model of user behavior employed as a prior data input to the alternative analysis is valid.

16. A computer-implemented method comprising:
transmitting interaction data conveying different versions of a user interface to each of multiple interaction devices operated by different users to perform a test of the different versions of the user interface;
commencing collection of a specified number of samples of user responses to the different versions of the user interface, wherein a sample of a user response comprises an action taken with respect to a version of the user interface;
analyzing initial ones of the samples for an occurrence of one of a primacy effect or a newness effect, a primacy effect indicated by a statistically significant decrease, at a change in the user interface, in a desired user response from returning users followed by a longer term rise in occurrences of that desired user response as compared to the initial statistically significant decrease, and a newness effect indicated by a statistically significant increase, at a change in the user interface, in a desired user response from returning users followed by a longer term fall in occurrences of the desired user response as compared to that initial significant increase;

discarding the initially collected ones of the samples based on detecting an occurrence of one of a primacy effect or a newness effect;
analyzing the samples which were not discarded as the samples are collected using Bayesian analysis;
determining whether a proposed version of the multiple versions elicits a statistically significant change in user response over a control version of the multiple versions;
terminating the test before the specified number of samples are collected in response to the proposed version eliciting a statistically significant change over the control version; and
completing collection of the specified number of samples and analyzing the samples using null-hypothesis significance test (NHST) in response to the proposed version not eliciting the statistically significant change.

17. The computer-implemented method of claim 16, the proposed version comprising a variation of a manner in which content is visually presented in the control version.

18. The computer-implemented method of claim 16, the method comprising:
employing Bayesian analysis to determine whether the proposed version is statistically likely to elicit a statistically significant increase in a sampled action over the control version; and
culling the proposed version from the test to shorten a duration of the test in response to determining that the proposed version is statistically unlikely to elicit a statistically significant increase in the sampled action over the control version.

19. The computer-implemented method of claim 16, the method comprising:
employing Bayesian analysis to determine whether any proposed version of the multiple versions is statistically likely to elicit a statistically significant increase in a sampled action over the control version; and
terminating the test before the specified number of samples are collected in response to determining that no proposed version of the multiple versions is statistically likely to elicit a statistically significant increase in the sampled action over the control version.

20. The computer-implemented method of claim 16, the method comprising:
extending a duration of the test to replace the initial ones of the samples with additional samples based on detection of an occurrence of one of a primacy effect or a newness effect.

21. The computer-implemented method of claim 16, the change in user response comprising at least one of clicking through more advertisements, exploring more webpages of a website, reducing bouncing, downloading more files, and sharing more information.

22. The computer-implemented method of claim 16, the method comprising:
comparing results of the NHST analysis to results of the Bayesian analysis; and
determining whether a model of user behavior employed as a prior data input to the Bayesian analysis is valid.

23. At least one machine-readable storage medium comprising instructions that when executed by a computing device, cause the computing device to:
transmit interaction data conveying different versions of a user interface to each of multiple interaction devices operated by different users to perform a test of the different versions of the user interface;

commence collection of a specified number of samples of user responses to the different versions of the user interface, wherein a sample of a user response comprises an action taken with respect to a version of the user interface;

analyze initial ones of the samples for an occurrence of one of a primacy effect or a newness effect, a primacy effect indicated by a statistically significant decrease, at a change in the user interface, in a desired user response from returning users followed by a longer term rise in occurrences of that desired user response as compared to the initial statistically significant decrease, and a newness effect indicated by a statistically significant increase, at a change in the user interface, in a desired user response from returning users followed by a longer term fall in occurrences of the desired user response as compared to that initial significant increase;

discard the initially collected ones of the samples based on detecting an occurrence of one of a primacy effect or a newness effect;

analyze the samples which were not discarded as the samples are collected using Bayesian analysis;

determine whether a proposed version of the multiple versions elicits a statistically significant change in user response over a control version of the multiple versions;

terminate the test before the specified number of samples are collected in response to the proposed version eliciting a statistically significant change over the control version; and complete collection of the specified number of samples and analyze the samples using null-hypothesis significance test (NHST) in response to the proposed version not eliciting the statistically significant change.

24. The at least one machine-readable storage medium of claim 23, the computing device caused to:
employ Bayesian analysis to determine whether the proposed version is statistically likely to elicit a statistically significant increase in a sampled action over the control version; and
cull the proposed version from the test to shorten a duration of the test in response to determining that the proposed version is statistically unlikely to elicit a statistically significant increase in the sampled action over the control version.

25. The at least one machine-readable storage medium of claim 23, the computing device caused to:
employ Bayesian analysis to determine whether any proposed version of the multiple versions is statistically likely to elicit a statistically significant increase in a sampled action over the control version; and
terminate the test before the specified number of samples are collected in response to determining that no proposed version of the multiple versions is statistically likely to elicit a statistically significant increase in the sampled action over the control version.

26. The at least one machine-readable storage medium of claim 23, the computing device caused to:
extend a duration of the test to replace the initial ones of the samples with additional samples based on detection of an occurrence of one of a primacy effect or a newness effect.

27. The at least one machine-readable storage medium of claim 23, the computing device caused to:
compare results of the NHST analysis to results of the Bayesian analysis; and
determine whether a model of user behavior employed as a prior data input to the Bayesian analysis is valid.

* * * * *